United States Patent
Xie et al.

(10) Patent No.: US 12,435,647 B1
(45) Date of Patent: Oct. 7, 2025

(54) COMPOSITE CASING FOR A TURBINE ENGINE

(71) Applicant: General Electric Company, Evendale, OH (US)

(72) Inventors: Ming Xie, Dayton, OH (US); Isak Varol, Istanbul (TR)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/092,615

(22) Filed: Mar. 27, 2025

(51) Int. Cl.
*F01D 25/24* (2006.01)
*F01D 25/00* (2006.01)

(52) U.S. Cl.
CPC ............ *F01D 25/24* (2013.01); *F01D 25/005* (2013.01); *F05D 2300/6012* (2013.01); *F05D 2300/603* (2013.01)

(58) Field of Classification Search
CPC .......... F01D 9/04; F01D 25/005; F01D 25/24; F05D 2240/10; F05D 2240/11; F05D 2240/14; F05D 2300/6012; F05D 2300/603
See application file for complete search history.

(56) References Cited

U.S. PATENT DOCUMENTS

| | | |
|---|---|---|
| 5,486,086 A | 1/1996 | Bellia et al. |
| 8,986,797 B2 | 3/2015 | Xie |
| 9,017,814 B2 | 4/2015 | Xie et al. |
| 10,161,419 B2 | 12/2018 | Care et al. |
| 10,385,870 B2 | 8/2019 | Crall |
| 10,927,703 B2 | 2/2021 | Kray et al. |
| 11,242,866 B2 | 2/2022 | Jain et al. |
| 2012/0251305 A1* | 10/2012 | McMillan ............. F04D 29/522 415/182.1 |

* cited by examiner

*Primary Examiner* — Christopher R Legendre
(74) *Attorney, Agent, or Firm* — McGarry Bair PC

(57) ABSTRACT

A casing for a turbine engine including a composite section. The composite section has (i) an arcuate shape or an annular shape and (ii) a circumferential direction. The composite section includes a matrix and a plurality of circumferential reinforcing fiber tows embedded in the matrix. Each circumferential reinforcing fiber tow of the plurality of circumferential reinforcing fiber tows extends in the circumferential direction and has a plurality of undulations in the circumferential direction to allow the matrix material of the composite section to expand circumferentially.

20 Claims, 9 Drawing Sheets

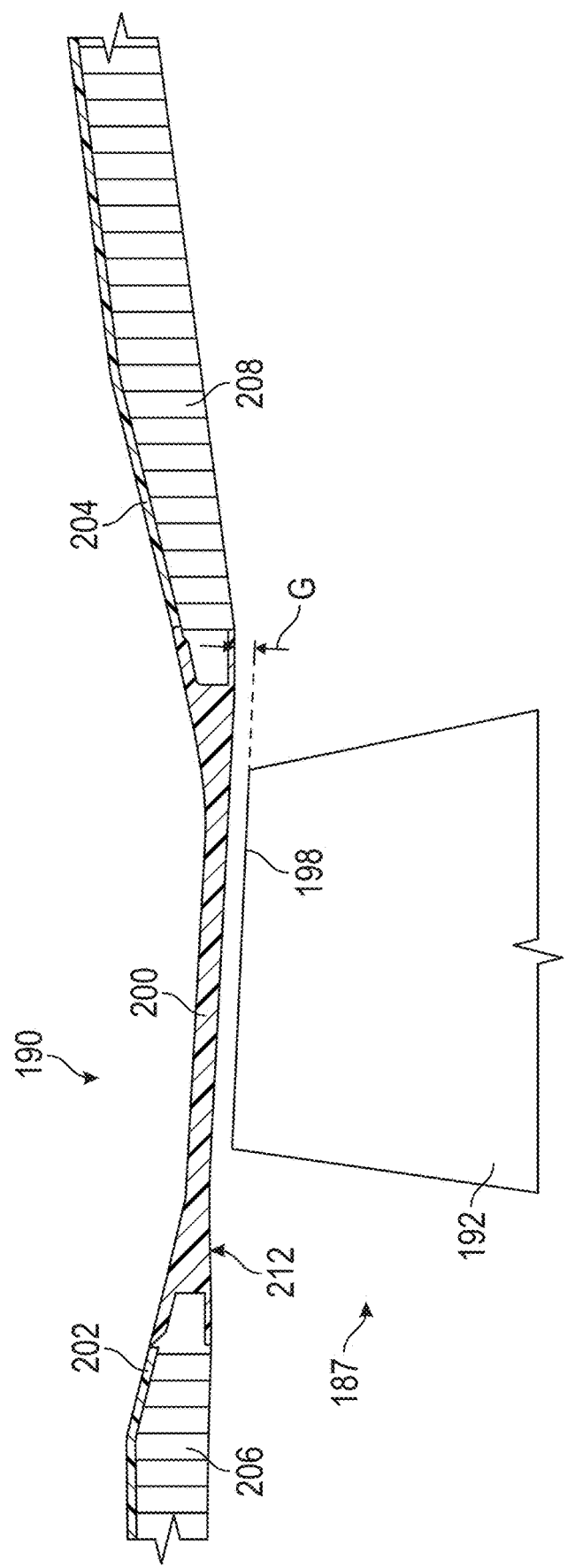

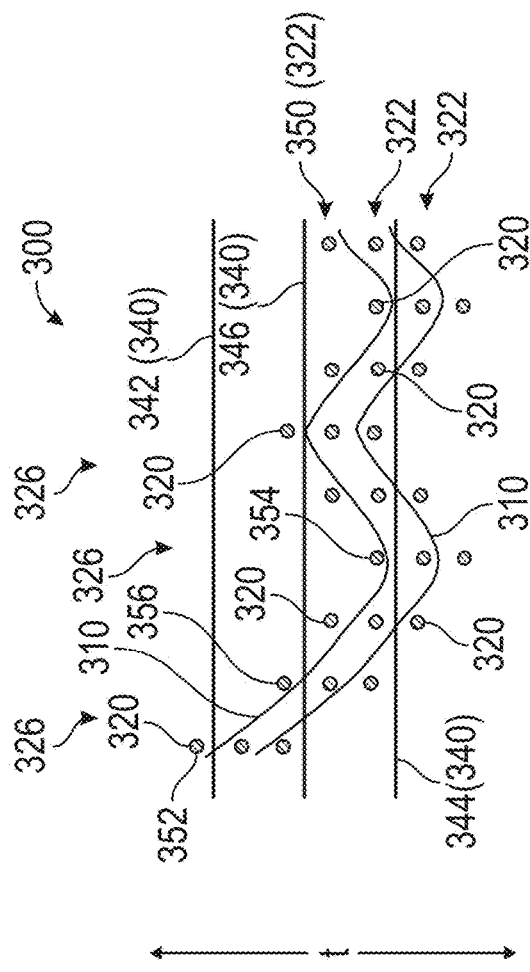
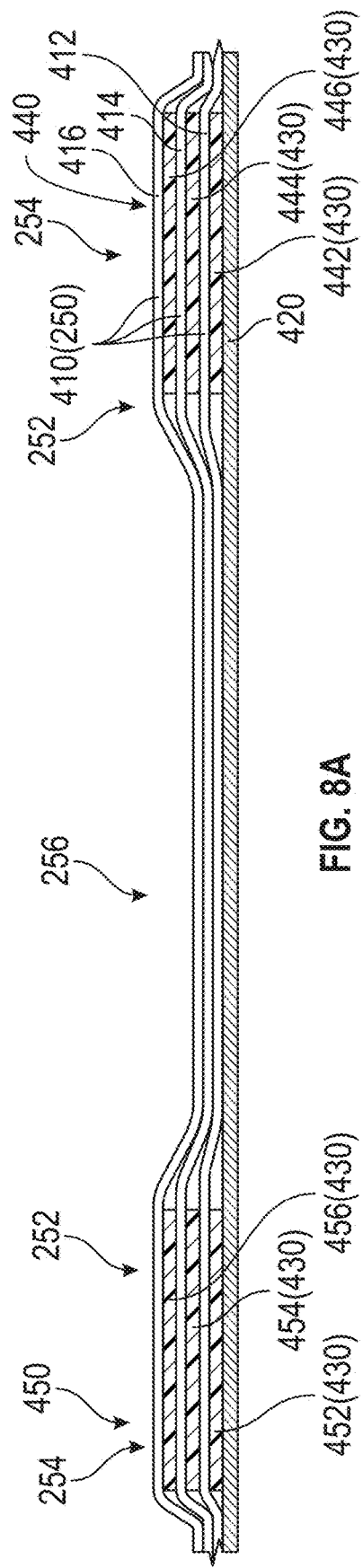

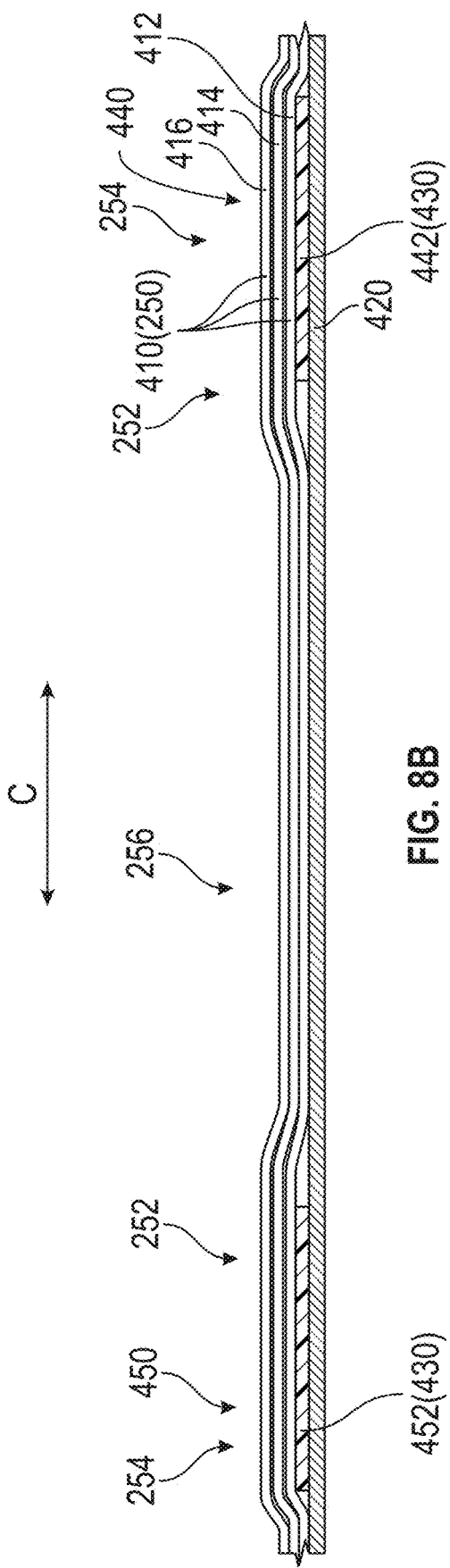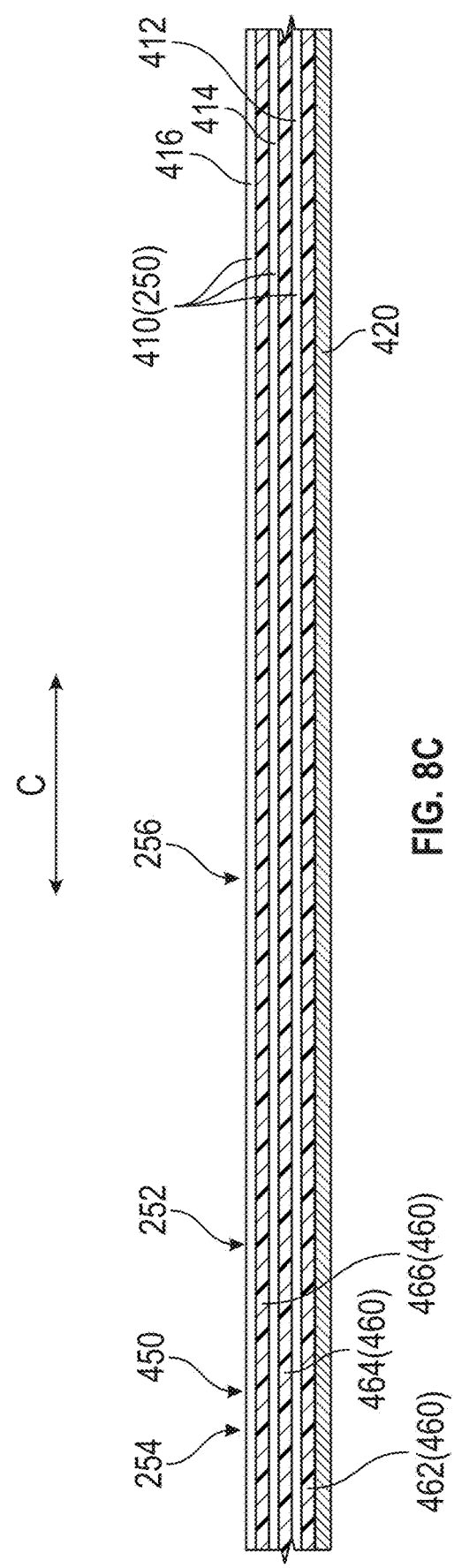

COMPOSITE CASING FOR A TURBINE ENGINE

TECHNICAL FIELD

The present disclosure relates to composite casings and methods of manufacturing composite casings, particularly, composite casings for aircraft engines.

BACKGROUND

Turbine engines used in aircraft generally include a fan and a turbo-engine section arranged in flow communication with one another. A combustor is arranged in the turbo-engine to generate combustion gases for driving a turbine in the turbo-engine of the turbine engine, and the turbine may be used to drive the fan. A portion of air flowing into the fan flows through the turbo-engine as core air, and another portion of the air flowing into the fan bypasses the core section and flows through the turbine engine as bypass air. The turbo-engine section may include one or more compressors to compress the core air before the core air flows into the combustor. Composite materials may be used to manufacture various components of the turbine engine, particularly, when the turbine engine is a turbine engine for an aircraft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 2 is a cross-sectional view of a portion of the turbine engine, showing detail 2 in FIG. 1.

FIG. 7 is a schematic, cross-sectional view of a portion of the 3D woven fabric that can be used to form the composite sections.

FIG. 8A is a schematic, cross-sectional view of layers and a lay-up of the composite plies that can be used to form the composite sections.

FIG. 8B is a schematic, cross-sectional view of layers and a lay-up of the composite plies that can be used to form the composite sections.

FIG. 8C is a schematic, cross-sectional view of layers and a lay-up of the composite plies that can be used to form the composite sections.

DETAILED DESCRIPTION

Figure 1:
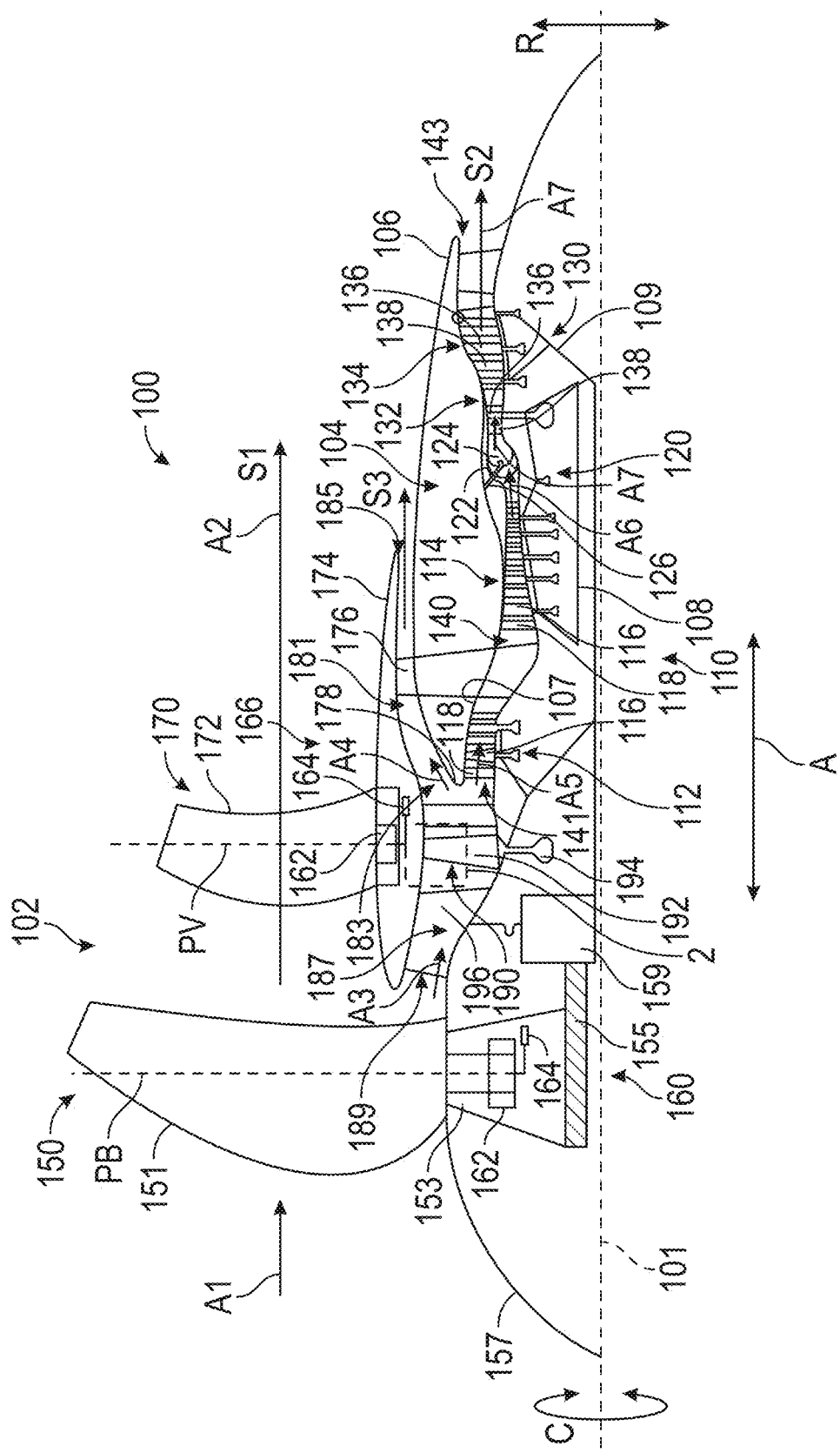
FIG. 1 is a schematic, cross-sectional view of a turbine engine of for an aircraft.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," "third," and the like, may be used interchangeably to distinguish one component from another and are not intended to signify location or importance of the individual components.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine or other component. Moreover, the terms "radial" and "radially" refer to directions and orientations that extend substantially perpendicular to the centerline. In addition, as used herein, the terms "circumferential" and "circumferentially" refer to directions and orientations that extend arcuately about the centerline.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), and a metal matrix composite (MMC). The composite may be formed of a matrix material and a reinforcing element, such as a fiber (referred to herein as a reinforcing fiber).

As used herein "reinforcing fibers" may include, for example, glass fibers, carbon fibers, steel fibers, or para-aramid fibers, such as Kevlar® available from DuPont of Wilmington, Delaware. The reinforcing fibers can be in the form of fiber tows that include a plurality of fibers that are formed into a bundle.

"Preform" as used herein is a piece of three-dimensional woven fabric formed by a plurality of reinforcing fibers including warp fiber tows and weft fiber tows.

As used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. The adhesive can require curing at elevated temperatures or other hardening techniques.

As used herein, PMC refers to a class of materials. The PMC material can be a prepreg. A prepreg is a reinforcement material (e.g., a reinforcing fiber) pre-impregnated with a polymer matrix material. Non-limiting examples of processes for producing polymeric prepregs include hot melt pre-pregging in which a molten resin is deposited onto the fiber reinforcement material and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermosets or thermoplastics. Thermoplastic resins are generally categorized as polymers that can be repeatedly softened and caused to flow when heated, and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg with thermoplastic polymers, another non-limiting example utilizes a woven fabric. Woven fabrics can include, but are not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and the reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin is then cured and removed from the mold. When removed from the mold, the composite component can require post-curing processing. RTM can be a vacuum assisted process. That is, air from the cavity or the mold can be removed and replaced by the resin prior to heating or curing. The placement of the dry fibers also can be manual or automated. The dry fibers can be contoured to shape the composite component or to direct the resin. Optionally, additional layers or reinforcing layers of a material differing from the dry fiber can also be included or added prior to heating or curing.

The term "metallic" as used herein is indicative of a material that is metal-based including metals, such as, but not limited to, titanium, iron, aluminum, stainless steel, and nickel alloys. A metallic material or a metal alloy can be a combination of at least two or more elements or materials, where at least one is a metal.

As used herein, an alloy is "based" on a particular element when that element is present in the alloy at the greatest weight percent, by total weight of the alloy, of all elements contained in the alloy. For example, an iron-based alloy has a higher weight percentage of iron than any other single element present in the alloy.

As noted above, certain components of gas turbine engines, particularly, those used in aircraft, can be made from composite materials. Such components can include, for example, various housing and casing structures. For example, a rotating airfoil assembly, such as a fan or a compressor rotor, includes rotating airfoils and may have a casing circumscribing the rotating airfoils. A casing comprising a composite material provides significant weight savings for use in a turbine engine for an aircraft. The composite material includes reinforcing fiber tows, such as reinforcing fiber tows formed from carbon fibers. The carbon fiber has very low coefficient of thermal expansion (CTE), e.g., nearly zero for many engineering applications, and, as a result, composite casings made from composite materials with carbon fibers typically expand very little during engine operation. When the casing is used for a rotating airfoil with airfoils that are also composite materials, the airfoils and the casing expand similarly during changes in operating conditions. When the casing is used for a rotating airfoil with a metallic blade, however, a larger radial clearance between the metallic blade and the composite case is maintained to prevent blade rubbing into the case during engine operation, as the metallic blade expands more than does the case. This larger radial clearance will reduce engine performance and fuel efficiency.

Disclosed herein is a casing (a composite casing) that includes at least a composite section. This composite casing, however, is designed to allow thermal expansion along with the airfoil even when the airfoil includes metallic blades. More specifically, the composite casing includes circumferential reinforcing fiber tows embedded in a matrix. These circumferential reinforcing fiber tows are undulated in the circumferential direction (e.g., undulating circumferential plies) to allow the matrix material to expand circumferentially. Such a construction increases the CTE of the composite material, as opposed to a composite without the undulation, as the thermal expansion is now mainly controlled by the matrix material. When the material is a resin material, for example, the resin material has much higher CTE than carbon fiber, resulting in a better matched CTEs between a rotor, such as the rotating airfoil assembly, and the case, improving engine performance.

FIG. 1 is a schematic, cross-sectional view a turbine engine 100 that can be used on an aircraft. The turbine engine 100 has an axial direction A (extending parallel to a longitudinal centerline (axis) 101, shown for reference in FIG. 1), a radial direction R, and a circumferential direction C. The circumferential direction C extends in a direction rotating about the longitudinal centerline (axis) 101 (the axial direction A). In the embodiment depicted in FIG. 1, the turbine engine 100 is an unducted fan engine or an open fan engine. The turbine engine 100 is a "three-stream engine" having three distinct streams (labeled S1, S2, and S3 in FIG. 1) of thrust-producing airflow during operation, as detailed further below. The turbine engine 100 includes a fan section 102 and a turbo-engine 104 disposed downstream from the fan section 102.

The turbo-engine 104 depicted in FIG. 1 includes, in serial flow relationship, a compressor section 110, a combustion section 120, and a turbine section 130. The turbo-engine 104 is substantially enclosed within a core cowl 106 that is substantially tubular and annularly surrounds the turbo-engine 104. The core cowl 106 defines a core inlet 141 and, in this embodiment, the core inlet 141 is annular. As schematically shown in FIG. 1, the compressor section 110 includes a booster or a low-pressure (LP) compressor 112 followed downstream by a high-pressure (HP) compressor 114. The combustion section 120 is downstream of the compressor section 110. The turbine section 130 is downstream of the combustion section 120 and includes a high-pressure (HP) turbine 132 followed downstream by a low-pressure (LP) turbine 134. The turbo-engine 104 further includes a core air exhaust nozzle 143 (also referred to as a jet exhaust nozzle) that is downstream of the turbine section 130. The compressor section 110, the combustion section 120, and the turbine section 130, together, define, at least in part, a core air flow path, also referred to as a core duct 140, extending from the core inlet 141 to the core air exhaust nozzle 143, and through which core air A5 flows. As will be discussed in more detail below, the turbo-engine 104 includes a high-pressure (HP) shaft 108 or a HP spool, and a low-pressure (LP) shaft 109. The HP shaft 108 drivingly connects the HP turbine 132 to the HP compressor 114. The HP turbine 132 and the HP compressor 114 rotate in unison through the HP shaft 108. The LP shaft 109 drivingly connects the LP turbine 134 to the LP compressor 112. The LP turbine 134 and the LP compressor 112 rotate in unison through the LP shaft 109.

Each of the LP compressor 112 and the HP compressor 114 may include a plurality of compressor stages. In each stage, a plurality of compressor blades 116 rotate relative to a corresponding plurality of static compressor vanes 118 (also called nozzles) to compress or to pressurize the core air A5 passing through the stage. In a single compressor stage, the plurality of compressor blades 116 can be provided in a ring, extending radially outwardly relative to the longitudinal centerline (axis) 101 from a blade platform to a blade tip (e.g., extend in the radial direction R). The compressor blades 116 can be a part of a compressor rotor that includes a disk, with compressor blades 116 extending radially from the disk. Other configurations of the compressor rotor can be used, including, for example, blisks where the disk and the compressor blades 116 are integrally formed with each other to be a single piece. The corresponding static compressor vanes 118 are positioned upstream of and adjacent to the rotating compressor blades 116. The static compressor vanes 118 for a stage of the compressor can be mounted to a core casing 107 in a circumferential arrangement. The core casing 107 may define, at least in part, the core air flow path (the core duct 140). Each compressor stage can be used to sequentially compress the core air A5 flowing through the core air flow path (the core duct 140), generating compressed air A6. Any suitable number of compressor blades 116, static compressor vanes 118, and compressor stages can be used.

Each of the HP turbine 132 and the LP turbine 134 also may include a plurality of turbine stages. In each stage, a plurality of turbine blades 136 rotates relative to a corresponding plurality of static turbine vanes 138 (also called a nozzle) to extract energy from combustion gases A7 passing through the stage. The turbine blades 136 can be a part of a turbine rotor. Any suitable configuration for a turbine rotor can be used, including, for example, a disk with the plurality of turbine blades 136 extending from the disk. The corresponding static turbine vanes 138 are positioned upstream of and adjacent to the rotating turbine blades 136. The static turbine vanes 138 for a stage of the turbine can be mounted to the core casing 107 in a circumferential arrangement.

In the combustion section 120, fuel, received from a fuel system (not shown), is injected into a combustion chamber 124 of a combustor 122 by fuel nozzles 126. The fuel is mixed with the compressed air A6 from the compressor section 110 to form a fuel and air mixture, and combusted, generating combustion products (i.e., combustion gases A7). As will be discussed further below, adjusting a fuel metering unit (not shown) of the fuel system changes the volume of fuel provided to the combustion chamber 124 and, thus, changes the amount of propulsive thrust produced by the turbine engine 100 to propel the aircraft. The combustion gases A7 are discharged from the combustion chamber 124. These combustion gases A7 can be directed into the turbine blades 136 of the HP turbine 132 and, then, the turbine blades 136 of the LP turbine 134, and the combustion gases A7 drive (rotate) the turbine blades 136 of the HP turbine 132 and the LP turbine 134. Any suitable number of turbine blades 136, static turbine vanes 138, and turbine stages can be used. After flowing through the turbine section 130, the combustion gases A7 are exhausted from the turbine engine 100 through the core air exhaust nozzle 143 to provide propulsive thrust.

The turbine engine 100 and, more specifically, the turbo-engine 104, further includes one or more drive shafts. As noted above, the turbo-engine 104 includes the HP shaft 108 drivingly connecting the HP turbine 132 to the HP compressor 114, and the LP shaft 109 drivingly connecting the LP turbine 134 to the LP compressor 112. More specifically, the turbine rotors of the HP turbine 132 are connected to the HP shaft 108, and the compressor rotors of the HP compressor 114 are connected to the HP shaft 108. The combustion gases A7 are routed into the HP turbine 132 and expanded through the HP turbine 132 where a portion of thermal energy or kinetic energy from the combustion gases A7 is extracted via the one or more stages of the turbine blades 136 and static turbine vanes 138 of the HP turbine 132. This causes the HP shaft 108 to rotate, which supports operation of the HP compressor 114 (self-sustaining cycle) and rotating the compressor rotors and, thus, the compressor blades 116 of the HP compressor 114 via the HP shaft 108. In this way, the combustion gases A7 do work on the HP turbine 132. The combustion gases A7 are then routed into the LP turbine 134 and expanded through the LP turbine 134. Here, a second portion of the thermal energy or the kinetic energy is extracted from the combustion gases A7 via one or more stages of the turbine blades 136 and the static turbine vanes 138 of the LP turbine 134. This causes the LP shaft 109 to rotate, which supports operation of the LP compressor 112 (self-sustaining cycle), and rotating the compressor rotors and, thus, the compressor blades 116 of the LP compressor 112 via the LP shaft 109. In this way, the combustion gases A7 do work on the LP turbine 134. The HP shaft 108 and the LP shaft 109 are disposed coaxially about the longitudinal centerline (axis) 101. The HP shaft 108 has a diameter greater than that of the LP shaft 109, and the HP shaft 108 is located radially outward of the LP shaft 109. The HP shaft 108 and the LP shaft 109 are rotatable about the longitudinal centerline (axis) 101 and, as discussed above, coupled to rotatable elements such as the compressor rotors and the turbine rotors.

The fan section 102 shown in FIG. 1 includes a fan, which is referred to herein as a primary fan 150. In the depicted embodiment, the primary fan 150 is an open rotor fan, also referred to as an unducted fan. The primary fan 150 has a plurality of primary fan blades 151 coupled to a fan disk 153. As depicted in FIG. 1, the primary fan blades 151 extend outwardly from the fan disk 153 generally along the radial direction R. One primary fan blade 151 is depicted in FIG. 1, but the plurality of primary fan blades 151 can be arranged in equal spacing around the longitudinal centerline (axis) 101. The primary fan blades 151 and the fan disk 153 are rotatable, together, about the longitudinal centerline (axis) 101 by a fan shaft 155. The fan disk 153 is covered by a fan hub 157 that is aerodynamically contoured to promote an airflow through the plurality of primary fan blades 151. In this embodiment, the fan hub 157 is rotatable together with the primary fan blades 151 and the fan disk 153.

As shown in FIG. 1, the fan shaft 155 is coupled with the LP shaft 109 via a speed reduction gearbox or a power gearbox, also referred to as a gearbox assembly 159. The LP shaft 109 is thus driving coupled to the primary fan. The gearbox assembly 159 is shown schematically in FIG. 1. The gearbox assembly 159 includes a plurality of gears for adjusting the rotational speed of the fan shaft 155 and, thus, the rotational speed of the primary fan 150 relative to the rotational speed of the LP shaft 109. The gearbox assembly 159 can be used to reduce the rotational speed to a speed that more efficient for the primary fan 150. The gearbox assembly 159 may have a gear ratio of 4:1 to 12:1, or 7:1 to 12:1, or 4:1 to 10:1, or 5:1 to 9:1, or 6:1 to 9:1, and can be configured in an epicyclic star configuration or a planet gear configuration. The gearbox assembly 159 can have a gear ratio of 4:1 to 10:1 for the unducted fan engine (e.g., the turbine engine 100). The gearbox assembly 159 can be a single stage gearbox or a compound gearbox (e.g., having a plurality of stages).

In the case of a variable pitch fan, as depicted in FIG. 1, for example, the plurality of primary fan blades 151 is rotatable relative to the fan disk 153 about a fan blade pitch axis PB. Each of the primary fan blades 151 can be connected to the fan disk 153 by a pitch bearing 162 that allows for rotation of the primary fan blades 151 about the pitch axis PB. The primary fan blades 151 are rotatable within the pitch bearing 162 by a pitch actuator 164 operatively coupled to the primary fan blades 151 to vary the pitch of corresponding primary fan blades 151. One or more pitch actuators 164 can be used, and, in some embodiments, the pitch actuators 164 rotate the primary fan blades 151 in unison. A fan actuation system 160 controls the one or more pitch actuators 164 to change the pitch of the primary fan blades 151 about their respective pitch axis PB. The fan actuation system 160 can be disposed within the fan hub 157.

The fan section 102 includes a plurality of fan guide vanes 172 (only one shown in FIG. 1). The fan guide vanes 172 are circumferentially spaced and disposed around the longitudinal centerline (axis) 101 as part of a fan guide vane array 170. In the embodiment depicted in FIG. 1, the fan guide vanes 172 are static airfoils and are not rotatable about the longitudinal centerline (axis) 101. Each fan guide vane 172 is mounted to a fan cowl 174 and extends outwardly from the fan cowl 174 generally along the radial direction R. In the case of a variable pitch fan, as depicted in FIG. 1, for example, the plurality of fan guide vanes 172 is rotatable relative to the fan cowl 174 about a fan guide vane pitch axis PV. A fan guide vane actuation system 166 can be used to change the pitch of the fan guide vanes 172. The fan guide vane actuation system 166 can operate similarly to the fan actuation system 160, discussed above, and that discussion applies here. The same reference numerals are thus used for the pitch bearings 162 and the pitch actuators 164 of the fan guide vane actuation system 166.

The fan cowl 174 annularly encases at least a portion of the core cowl 106 and is generally positioned outward of the core cowl 106 along the radial direction R. Together, the fan cowl 174 and the core cowl 106 define an outer casing of the turbine engine 100. A downstream section of the fan cowl 174 extends over a forward portion of the core cowl 106 to define a fan flow path, also referred to as a fan duct 181. Incoming air enters through the fan duct 181 through a fan duct inlet 183 and exits through a fan exhaust nozzle 185 to produce propulsive thrust. The fan duct 181 is an annular duct positioned generally outward of the core duct 140 along the radial direction R. The fan cowl 174 and the core cowl 106 are connected together and supported by a plurality of struts 176 (only one shown in FIG. 4). The struts 176 are circumferentially spaced about longitudinal centerline (axis) 101 and extend radially outward from the core cowl 106. Each strut of the plurality of struts 176 is aerodynamically contoured to direct air flowing thereby.

The turbine engine 100 includes an inlet duct 187. The inlet duct 187 extends between an engine inlet 189 and the core inlet 141, and the fan duct inlet 183. The engine inlet 189 is defined generally at the forward end of the fan cowl 174 and is positioned between the primary fan 150 and the fan guide vanes 172 along the axial direction A. The inlet duct 187 is an annular duct that is positioned inward of the fan cowl 174 along the radial direction R. Air flowing downstream along the inlet duct 187 is split, not necessarily evenly, into the core duct 140 and the fan duct 181 by a splitter 178 of the core cowl 106. The inlet duct 187 is wider than the core duct 140 in the radial direction R. The inlet duct 187 is also wider than the fan duct 181 in the radial direction R.

The fan section 102 also includes a mid-fan 190. The mid-fan 190 includes a plurality of mid-fan blades 192 (only one shown in FIG. 4). The plurality of mid-fan blades 192 is rotatable about the longitudinal centerline axis 101. In the depicted embodiment, the mid-fan 190 is drivingly coupled with the LP turbine 134 via the LP shaft 109. The plurality of mid-fan blades 192 can be arranged in equal circumferential spacing about the longitudinal centerline axis 101. The mid-fan blade 192 can be a part of a rotor that includes a central hub, such as a disk 194, and each mid-fan blade 192 of the plurality of mid-fan blades 192 extends radially from the disk 194. Other configurations of the compressor rotor can be used, including, for example, blisks where the disk 194 and the mid-fan blades 192 are integrally formed with each other to be a single piece.

The plurality of mid-fan blades 192 is annularly surrounded (e.g., ducted) by the fan cowl 174. In this regard, the mid-fan 190 is positioned inward of the fan cowl 174 along the radial direction R. The mid-fan 190 is positioned within the inlet duct 187 upstream of both the core duct 140 and the fan duct 181. A ratio of a span of a primary fan blades 151 to that of a mid-fan blade 192 (a span is measured from a root to a tip of the respective blade) is greater than two and less than ten to achieve the desired benefits of the third stream (S3), particularly, the additional thrust the third stream (S3) offers to the engine, which can enable a smaller diameter primary fan blade 151. A plurality of inlet mid-fan vanes 196 is positioned upstream of and adjacent to the rotating mid-fan blade 192. The inlet mid-fan vanes 196 can be mounted to the fan cowl 174 in a circumferential arrangement.

During operation of the turbine engine 100, an initial airflow or incoming air A1 passes through the primary fan blades 151 of the primary fan 150 and splits into a first airflow (a first portion of air, which is referred to herein as primary bypass air A2) and a second airflow (a second portion of air, which is referred to herein as engine air A3). The primary bypass air A2 bypasses the engine inlet 189 and flows generally along the axial direction A outward of the fan cowl 174 along the radial direction R. The primary bypass air A2 is accelerated by the primary fan blades 151 and passes through the fan guide vanes 172. The primary bypass air A2 then continues downstream to produce a primary propulsion stream or a first thrust stream S1. A majority of the net thrust produced by the turbine engine 100 is produced by the first thrust stream S1.

The engine air A3 is directed or routed into the inlet duct 187 and enters the inlet duct 187 through the engine inlet 189. The engine air A3 flowing downstream through the inlet duct 187 flows through the mid-fan blades 192 of the mid-fan 190 and is compressed by the rotating mid-fan blade 192. After flowing through the mid-fan blade 192, the engine air A3 is split by the splitter 178 into a third airflow (a third portion of air, which is referred to herein as secondary bypass air A4) and a fourth airflow (a fourth portion of air, which is referred to herein as core air A5). The core air A5 is directed or is routed into an upstream section of the core duct 140, or, more specifically, into the core inlet 141. The core air A5 flows through the core duct 140 (as discussed above) to generate combustion gases A7 and exits the core duct 140 through the core air exhaust nozzle 143 to produce a core air stream, also referred to as a second thrust stream S2.

The secondary bypass air A4 is directed or routed into the fan duct 181 and enters the fan duct 181 through the fan duct inlet 183. The secondary bypass air A4 flows generally along the axial direction A through the fan duct 181 and is exhausted from the fan duct 181 through the fan duct inlet 183 to produce a third stream, also referred to as a third thrust stream S3. The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust can be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and, thereby, a percent contribution to total thrust, are passively adjusted during engine operation or can be modified purposefully through the use of engine control features (such as fuel flow, electric machine power, variable stators, variable inlet guide vanes, valves, variable exhaust geometry, or fluidic features) to adjust or to improve overall system performance across a broad range of potential operating conditions.

The turbine engine 100 shown in FIG. 1 and discussed herein (e.g., an unducted fan engine) is provided by way of example only. In other embodiments, any other suitable engine can be utilized with aspects of the present disclosure. For example, in other embodiments, the engine can be any other suitable gas turbine engine, such as a high bypass turbofan engine, a turboshaft engine, a turboprop engine, a turbojet engine, and the like. In such a manner, in other embodiments, the gas turbine engine may have other suitable configurations, such as other suitable numbers or arrangements of shafts, compressors, turbines, fans, etc. Further, although the turbine engine 100 is shown as a geared, variable pitch turbofan engine, in other embodiments, the turbine engine 100 can be a direct drive turbine engine or can be a fixed-pitch turbine engine. In other embodiments, the primary fan 150 and the fan guide vane array 170 can be ducted or shrouded, including a nacelle or a shroud that circumferentially surrounds one or both of the primary fan 150 and the fan guide vane array 170, either collectively or individually. Further, still, in alternative embodiments, aspects of the present disclosure can be incorporated into, or otherwise utilized with, any other type of engine, such as reciprocating engines.

The turbine engine 100 discussed herein is suitable for use on aircraft. Suitable aircraft include, for example, airplanes and unmanned aerial vehicles (UAV). In other embodiments, the turbine engine can be any other turbine engine, such as an industrial turbine engine incorporated into a power generation system, or a nautical turbine engine on a ship or other vessel.

FIG. 2 is a cross-sectional view of a portion of the inlet duct 187, including the mid-fan blade 192, showing detail 2 in FIG. 1. As noted above, the fan cowl 174 (FIG. 1) defines, in part, the inlet duct 187 and circumferentially surrounds the mid-fan blades 192. More specifically, the fan cowl 174 can include one or more casings or casing segments, to define the inlet duct 187. In the depicted embodiment, a fan casing 200 is positioned radially outward of the mid-fan blades 192. The fan casing 200 is at an axial position to circumscribe the mid-fan blades 192 in surrounding relationship therewith. Each of the mid-fan blades 192 includes a tip 198 and the fan casing 200 has an inner radial surface 212. The mid-fan 190 and the fan casing 200 are positioned relative to each other to define a gap G (or a clearance) between the fan casing 200 and the mid-fan blade 192 and, more specifically, between the inner radial surface 212 of the fan casing 200 and the tip 198 of each mid-fan blade 192. The fan casing 200 can be part of a blade containment system that is used to retain broken blades or blade fragments therein. The fan casing 200 can be formed from composite materials. The fan casing 200 can be a composite component, and, more specifically, a composite casing.

In the depicted embodiment, the fan casing 200 is connected to adjacent casings (or casing segments) that also define the inlet duct 187 or portions thereof. More specifically, the fan casing 200 abuts an upstream casing 202 and a downstream casing 204. The upstream casing 202 and the downstream casing 204 are depicted with acoustic panels and, more specifically, an upstream acoustic panel 206 and a downstream acoustic panel 208 are affixed to one of the upstream casing 202 and the downstream casing 204, respectively. The acoustic panels, however, can be omitted.

Figure 3B:
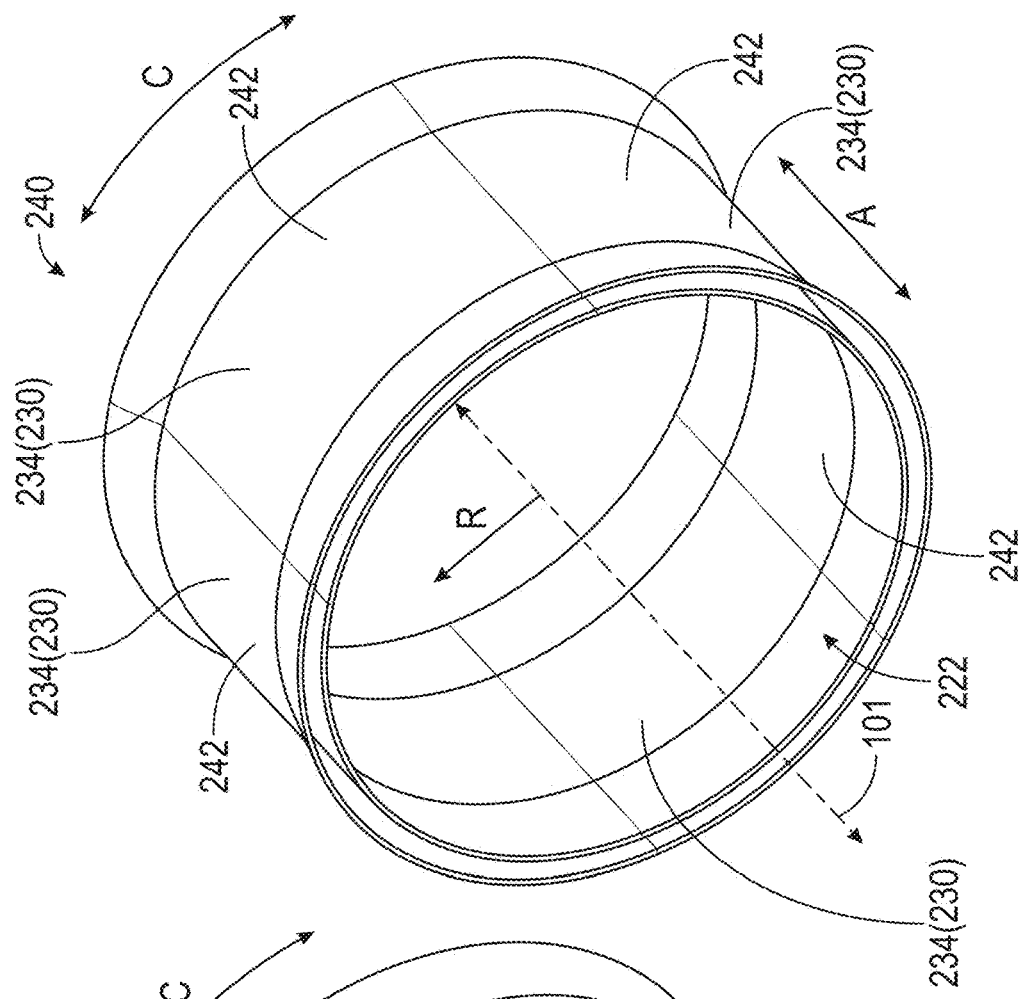
FIG. 3B is a schematic view of another fan casing that can be used in the turbine engine in FIG. 1.
Figure 3A:
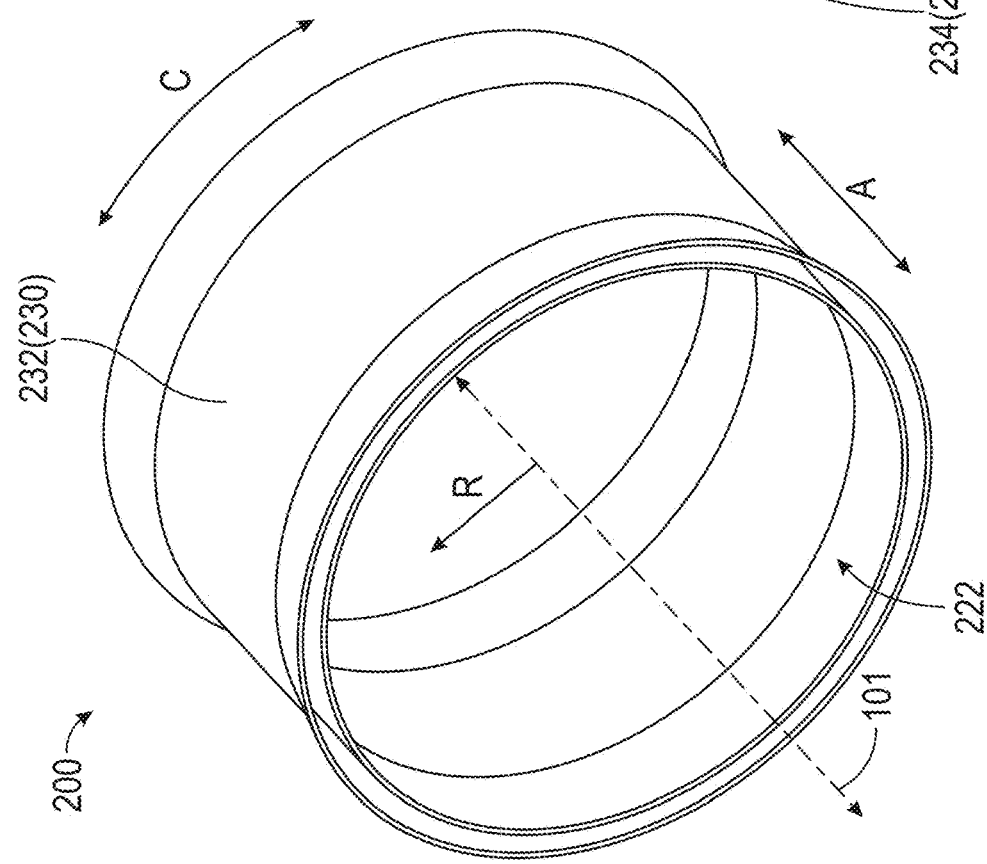
FIG. 3A is a schematic view of a fan casing that can be used in the turbine engine in FIG. 1.

FIG. 3A is a schematic view of the fan casing 200. As can be seen in FIG. 3A, the fan casing 200 is annular about the longitudinal centerline axis 101. The fan casing 200 can be symmetrical, defining an opening 222 that is circular and in which the mid-fan 190 (FIG. 1) is located when the fan casing 200 is installed in the turbine engine 100 (FIG. 1). In the embodiment depicted in FIG. 3A, the fan casing 200 is a single, unitary component in the circumferential direction C. The fan casing 200 can be a continuous, unbroken structure in the circumferential direction C and can be a continuous annular structure. As noted above, the fan casing 200 is a composite component, and the fan casing 200 depicted in FIG. 3A can be formed from a single composite section 230 having an annular shape. The composite section 230 shown in FIG. 3B will be referred to more specifically as an annular composite section 232.

FIG. 3B is a schematic view of another fan casing 240. The fan casing 240 shown in FIG. 3B is an alternative construction of a fan casing that can be used in place of the fan casing 200 and, unless otherwise indicated, the discussion of the fan casing 200 applies to the fan casing 240 shown in FIG. 3B, and this fan casing 240 can be used in the same or a similar manner to the fan casing 200 as discussed herein. In this embodiment, the fan casing 240 is formed from a plurality of segments in the circumferential direction C (a plurality of circumferential segments 242). Each of these circumferential segments 242 has an arcuate shape and can be connected together using a suitable attachment means, such as fasteners, to form the annular fan casing 240. Four circumferential segments 242 are depicted in FIG. 3B, but other numbers of segments can be used. Each of these circumferential segments 242 can be made from a composite material and can be a composite section 230 having an arcuate shape. The fan casing 240 shown in FIG. 3B is thus formed from a plurality of composite sections 230 and each of these composite sections 230 will be referred to more specifically as an arcuate composite section 234. Reference numeral 230 is used herein to refer to either of the annular composite section 232 or the arcuate composite section 234.

Figure 4:
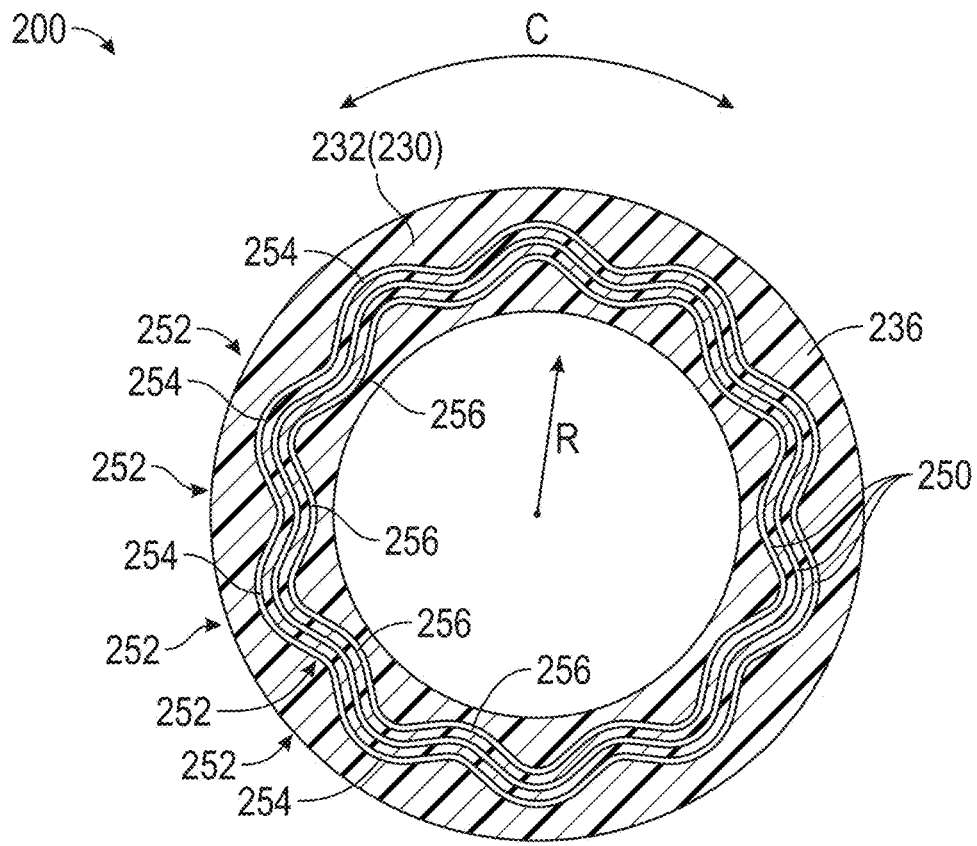
FIG. 4 is a cross-sectional view of the fan casing shown in FIG. 3A.

FIG. 4 is a cross-sectional view of the fan casing 200 and, more specifically, the composite section 230 (e.g., the annular composite section 232). The composite section 230 includes a matrix 236 and a plurality of circumferential reinforcing fiber tows 250 embedded in the matrix 236. Each circumferential reinforcing fiber tow 250 extends in the circumferential direction C of the composite section 230 and has a plurality of undulations 252 in the circumferential direction C. While the circumferential reinforcing fiber tows 250 extend in the circumferential direction, the circumferential reinforcing fiber tows 250 also have an alternating directionality radially inward and outward to create the plurality of undulations 252. The circumferential reinforcing fiber tows 250 thus have a zig-zag pattern or an alternating pattern extending in the circumferential direction C. The circumferential reinforcing fiber tows 250 are depicted as having as a sinusoidal pattern extending in the circumferential direction C. The methods of forming the composite section 230 can result in undulations having other shapes and arrangements. For example, these shapes and arrangements can have different segments between adjacent peaks 254 and troughs 256 of the undulating pattern, such as rectilinear shapes or curvilinear shapes between the adjacent peaks 254 and troughs 256. These shapes and arrangements also can be a regular, repeating pattern, with, for example, the alternating pattern of the plurality of undulations 252 being uniform in the circumferential direction C, having a constant spacing between adjacent peaks 254 and troughs 256, and a constant amplitude of peaks 254 and troughs 256. Alternatively, the alternating pattern can have a random arrangement.

As depicted in FIG. 4, each undulation 252 of the circumferential reinforcing fiber tows 250 has an amplitude that extends in the radial direction R. The undulations 252 are sized such that the length of each circumferential reinforcing fiber tows 250 is longer than the circumferential length of the composite section 230. For example, the length of each circumferential reinforcing fiber tows 250 can be longer one percent (1%) to ten percent (10%) longer than the circumferential length of the composite section 230.

With this fiber pattern of the circumferential reinforcing fiber tows 250, the matrix 236 is allowed to expand and to contract with changes in the temperature of the fan casing 200. The fan casing 200 shown in FIG. 4 is a composite material and can be made from PMC materials, for example. In such cases, the matrix 236 is a polymer and the circumferential reinforcing fiber tows 250 can be formed from one or more of the various reinforcing fiber tows discussed above, such as carbon fibers. When the circumferential reinforcing fiber tows 250 are formed from carbon fibers, the circumferential reinforcing fiber tows 250 provide strength, particularly, impact strength, to the fan casing 200, allowing the fan casing 200 to be a containment barrier for the blade containment system to retain broken blades or blade fragments and to prevent these broken blades or blade fragments from being ejected through the fan casing 200. Carbon fibers (or other fibers used for the circumferential reinforcing fiber tows 250), however, have a low coefficient of thermal expansion (CTE), as discussed above. In contrast, the polymer matrix may have a relatively high CTE. As used herein, a low CTE can be a CTE that is $1 \times 10^{-6}$ inch per inch-degrees Fahrenheit (in/(in $°$ F.)) or lower. Also as used herein, a high CTE can be twice that amount or more, such as five times that amount or more, or even an order of magnitude higher than that amount or more, such as a CTE that is $2 \times 10^{-6}$ inch per inch-degrees Fahrenheit (in/(in $°$ F.)) or higher, $5 \times 10^{-6}$ inch per inch-degrees Fahrenheit (in/(in $°$ F.)) or higher, or $10 \times 10^{-6}$ inch per inch-degrees Fahrenheit (in/(in $°$ F.)) or higher.

In a fiber pattern without the undulations 252, the circumferential reinforcing fiber tows constrain the polymer matrix, preventing the matrix from expanding with increasing temperature. When the mid-fan blade 192 (FIG. 2) is formed from a similar material (e.g., a composite material), the mid-fan blade 192 also has a low CTE limiting growth in the radial direction from temperature increases, and, thus, a tight clearance (gap G, FIG. 2) can be maintained through the entire operating envelope. In some embodiments, the mid-fan blade 192 is formed from a dissimilar material to that of the fan casing 200. For example, the mid-fan blade 192 can be formed of a material, such as a metal material, that has a higher CTE than a composite section without the undulations. To accommodate the thermal growth of the mid-fan blade 192 in the radial direction during operation, the gap G at low temperatures (such as ambient temperatures or room temperature corresponding to assembly of, for example, seventy degrees Fahrenheit (70° F.) (twenty-one degrees Celsius (21° C.)), is much larger than the gap at operating temperature. Such operating temperatures can be, for example, three hundred degrees Fahrenheit (300° F.) (two hundred sixty degrees Celsius (260° C.)) or greater.

This large gap G, thus, limits the efficiency of engine operation at the lower temperatures.

In the fiber pattern discussed herein, the undulations 252 impart additional length to the circumferential reinforcing fiber tows 250. The circumferential reinforcing fiber tows 250 thus does not constrain the matrix 236, at least initially, allowing the matrix material of the composite section to expand circumferentially as the temperature increases from ambient or assembly temperatures to the operating temperatures for the mid-fan 190 (FIG. 2). The fan casing 200 is assembled within the fan cowl 174 to allow for radial movement of the fan casing 200 and, thus, with the increasing circumference of the fan casing 200, the fan casing 200 also moves radially outward. With the fiber pattern discussed herein, the radial growth can be controlled based on the expected growth of the mid-fan blade 192 (FIG. 2) to provide for a better gap G throughout the entire operating envelope. The undulations 252 can sized such that the length of each circumferential reinforcing fiber tow 250 permits thermal expansion of the matrix 236 to maintain the gap G during an operating condition of the turbine engine. The operating condition can be a temperature from negative seventy degrees Fahrenheit to seven hundred degrees Fahrenheit.

The fan casing 200 and the mid-fan 190 (FIG. 1) are provided by way of example. The fiber pattern discussed herein can be used with other composite casing structures used in other applications, including other locations within the turbine engine 100 (FIG. 1), such as, for example, the core casing 107 (FIG. 1) surrounding the compressor blades 116 (FIG. 1), where the casing and the structure encased by the casing (e.g., a rotor) are dissimilar materials. As noted above, in still other embodiments, the fiber pattern discussed herein can be used with other composite casing structures used in other engines or rotary machines. One such example includes other gas turbine engines, like a high bypass turbofan engine, where the primary fan 150 and the fan guide vane array 170 is ducted or shrouded. The mid-fan 190 is an example of a rotor, and, more specifically a rotating airfoil assembly including a plurality of airfoils (e.g., the mid-fan blades 192 in FIG. 1) extending radially from a central hub (e.g., the disk 194 in FIG. 1).

The circumferential reinforcing fiber tows 250 can be arranged in a plurality of fiber layers in the radial direction, as depicted in FIG. 4. Each of these fiber layers can include the plurality of undulations 252, and, in the depicted embodiment, the circumferential reinforcing fiber tows 250 have a uniform undulating pattern through the plurality of layers and also in the circumferential direction C. The particular form of the layers can depend upon the layup method or the preform structure for the circumferential reinforcing fiber tows 250, and, likewise, the methods for generating the plurality of undulations 252 can vary depending upon the layup method of the preform structure.

Figure 5:
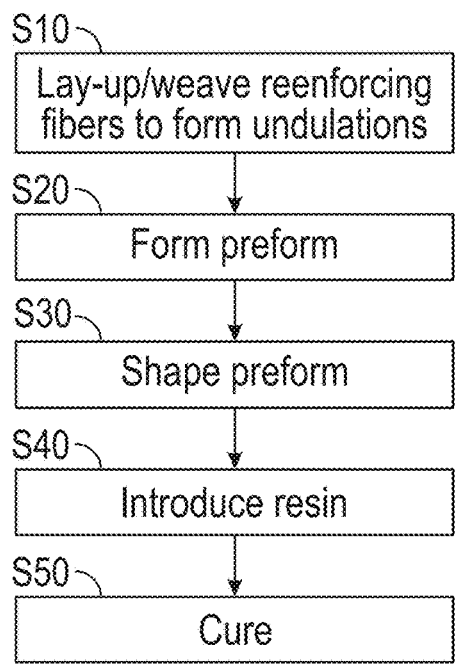
FIG. 5 is a flow chart of a process of manufacturing a composite section of the fan casing that can be used in the turbine engine of FIG. 1.

FIG. 5 is a flow chart of a process of manufacturing the composite section 230. The method includes, in step S10, laying up or otherwise placing a plurality of reinforcing fiber tows, including the circumferential reinforcing fiber tows 250 (FIG. 4), to form the undulations 252 (FIG. 4). Various methods can be used to lay up the reinforcing fiber tows and some examples of forming the undulations 252 are discussed further below. For example, the methods may include winding the plurality of reinforcing fiber tows around a mandrel. The reinforcing fiber tows can be moved axially as the mandrel is rotated to form a plurality of plies or layers. Each of the plies includes a plurality of fiber tows. When applied using a mandrel, the undulations 252 are primarily oriented in the circumferential direction C (FIG. 4) but may also have a component or be angled in the axial direction A (FIG. 3A).

The plurality of plies can also be laid up by hand (i.e., hand lay-up) or using an automated process including an automated lay-up system. The automated lay-up system and the corresponding automated process can be, for example, an Automated Tape Laying (ATL) system, an Automated Fiber Placement (AFP) system, a Thermoplastic Fiber/Tape Placement (TTP) system, a Pick-and-Place system, and the like. Other methods can be used, including, weaving methods or braiding methods. Two-dimensional (2D) woven fabrics can be woven and then sheets of 2D woven fabric are lay up to form the plurality of plies. Other weaving methods include, weaving three-dimensional (3D) woven fabrics.

In step S20, the method includes forming or preparing a preform and, more specifically, an initial preform. The initial preform can be formed by laying up the reinforcing fiber tows and this step, or portions thereof, can be completed as part of the lay-up process (step S10). When woven fabrics (either 2D woven fabrics or 3D woven fabrics) are used, the initial preform can be formed by using one or more pieces of woven fabric. In some embodiments when a 3D woven fabric is used, the 3D woven fabric can be near net shape. This step may include, for example, laying up a plurality of woven fabrics or otherwise positioning the plurality of woven fabrics relative to each other to form the initial preform. The initial preform is shaped to form a shaped preform in step S30. Shaping the initial preform may include, for example, using a mold tool to shape the initial preform. Suitable shaping processes may include vacuum forming or other forming processes to impart a shape to the initial preform. The shaped preform may form a final preform, but, optionally, additional machining processes and manufacturing processes, such as adding inserts, may be carried out on the shaped preform to form the final preform for the composite component.

In step S40, a matrix material is introduced into the preform. For example, after the preform is complete (i.e., the final preform), a matrix material can be injected into the preform, in step S40, to generate an infiltrated (or an impregnated) preform. When the composite component is a polymer matrix composite, polymers and/or a resin can be pumped into, injected into, or otherwise provided to a mold or a cavity to infiltrate or to impregnate the dry fibers in this step. This step can be done in conjunction with step S30 when using resin transfer molding (RTM) processes, for example. Other infiltration processes can be used in this step, depending upon the matrix material. The matrix material can be introduced in other ways. As noted above, the preform can be formed using prepreg fiber tows to introduce a matrix material, and, in such an embodiment, the matrix material is introduced when the reinforcing fiber tows are woven into the preform (step S10) or when the reinforcing fiber tows are otherwise laid up. When prepreg fiber tows are used, an explicit step of injecting a resin material can be omitted.

The method continues with curing the infiltrated preform in step S50 to bond the composite material and, more specifically, the matrix together, forming the composite component. The curing process depends upon the material and may include solidifying or otherwise hardening the matrix material around the fiber tows within the preform. For example, when the matrix material is a polymer, the curing may include both solidifying and chemically cross-linking the polymer chains. Curing the infiltrated preform can include several processes. For instance, an infiltrated preform can be debulked and cured by exposing the infiltrated preform to elevated temperatures and pressures in an autoclave. The infiltrated preform may also be subjected to one or more further processes, such as, e.g., a burn off cycle and a densification process. The curing step S50 can be done in conjunction with step S40, such as when the matrix material is injected into the final preform in a molten state and the curing step includes cooling the matrix material.

Further, the composite component can be finish machined as needed. Finish machining may define the final finished shape or contour of the composite component. Additionally, the composite component can be coated with one or more suitable coatings, such as, e.g., an environmental barrier coating (EBC) or a polyurethane surface coating.

Figure 6A:
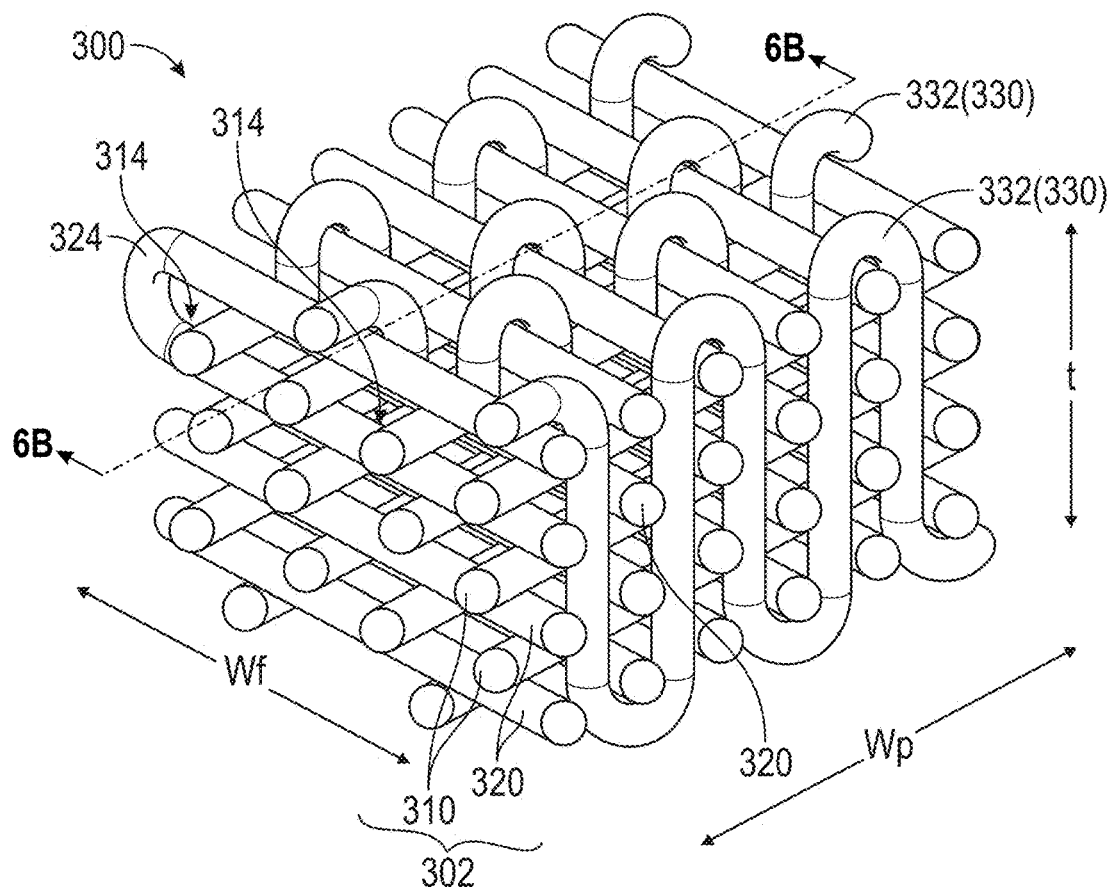
FIG. 6A is a schematic view of a three-dimensional (3D) fiber weave pattern used for a 3D woven fabric.
Figure 6B:
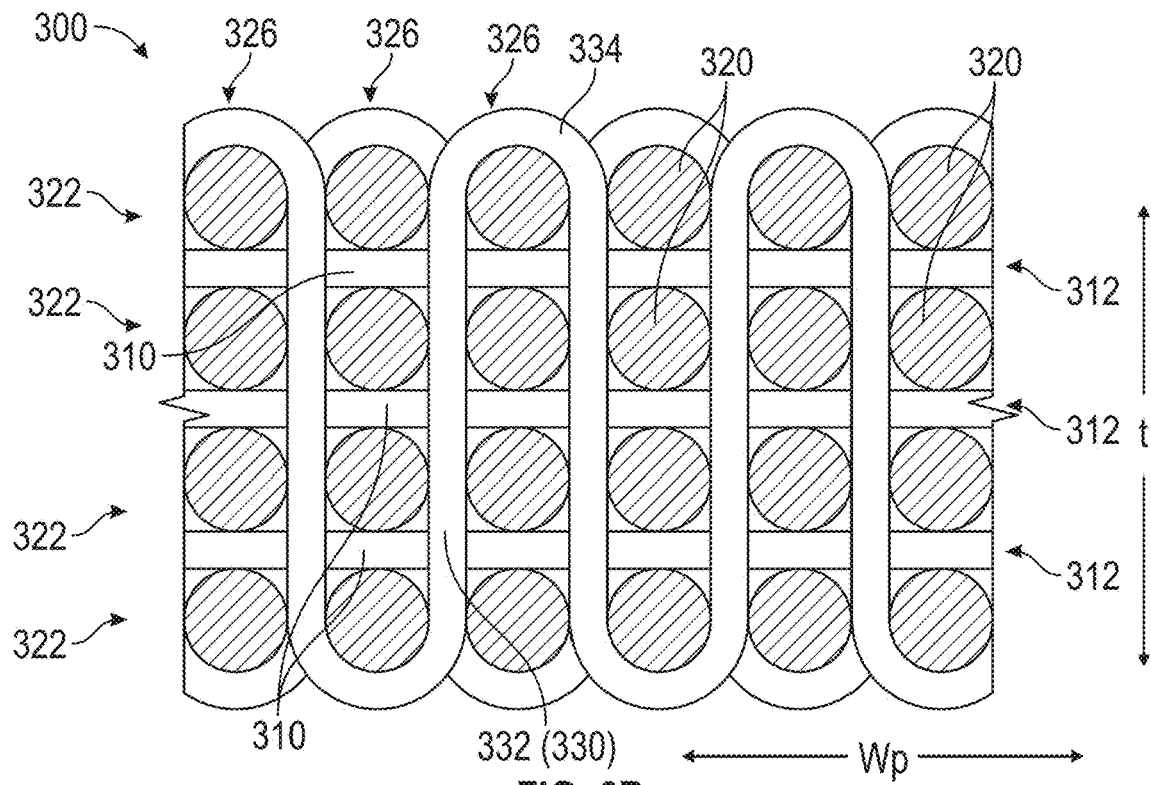
FIG. 6B is a schematic, cross-sectional view of the fiber weave pattern shown in FIG. 6A taken along line 6B-6B in FIG. 6A.

FIGS. 6A and 6B are schematic views showing a three-dimensional fiber weave pattern that can be used to form a woven fabric used to form a preform for the composite section 230 (FIGS. 3A and 3B). For clarity with other embodiments, the woven fabric depicted in FIGS. 6A and 6B is referred to herein as a 3D woven fabric 300. FIG. 6B is a cross-sectional view taken along line 6B-6B in FIG. 6A. As noted above, the composite components can be formed from a plurality of reinforcing fibers and, more specifically, a plurality of reinforcing fiber tows 302. The plurality of reinforcing fiber tows 302 is woven together to form the 3D woven fabric 300. The plurality of reinforcing fiber tows 302 includes a plurality of first fiber tows, which, in this embodiment, is a plurality of warp fiber tows 310. The plurality of reinforcing fiber tows 302 also includes a plurality of second fiber tows, which, in this embodiment, is a plurality of weft fiber tows 320. The weft fiber tows 320 are oriented transversely to the warp fiber tows 310, and, in the depicted embodiment, the warp fiber tows 310 and the weft fiber tows 320 are oriented generally orthogonally to each other. The 3D woven fabric 300 thus includes a warp direction Wp (also referred to as a first direction) and a weft direction Wf (also referred to as a second direction). The warp fiber tows 310 extend in the warp direction Wp and the weft fiber tows 320 extend in the weft direction Wf.

In the depicted embodiment, the 3D woven fabric 300 is a three-dimensional woven fabric and the 3D woven fabric 300 also includes a thickness direction t. The thickness direction may also be referred to as a z direction. The warp fiber tows 310 can be arranged relative to each other to form a plurality of warp fiber layers 312 in the thickness direction t and to form a plurality of warp fiber columns 314 in the weft direction Wf. Three warp fiber layers 312 are depicted in FIGS. 6A and 6B, but the 3D woven fabric 300 may include any other numbers of warp fiber layers 312, including more than three warp fiber layers 312.

During a weaving process, the warp fiber tows 310 can be held in tension in the warp direction Wp, and one of the weft fiber tows 320 is passed or drawn therethrough. A shuttle (not shown) can be used to draw the one of the weft fiber tows 320 through the warp fiber tows 310. The shuttle can be passed through the warp fiber tows 310 in a first direction and then reversed to pass through the warp fiber tows 310 at a different height in the thickness direction forming a plurality of weft fiber layers 322 in the thickness direction t. One of the weft fiber tows 320 can be continuous through at least a portion of the thickness of the 3D woven fabric 300, and the one of the weft fiber tows 320 may include a portion extending in the thickness direction t, which can be referred to in some embodiments as a turnaround. This portion of the weft fiber tow thus can be referred to herein as a turnaround portion 324. The warp fiber tows 310 can be moved relative to each other to allow a space for the one of the weft fiber tows 320 to pass through the space. The warp fiber tows 310 can be moved relative to each other in different ways to create different patterns. In this way, weaving the 3D woven fabric 300 includes positioning the warp fiber tows 310 (e.g., such that the warp fiber tows 310 are held stationary in tension), then laying the weft fiber tows 320 (e.g., such that the weft fiber tows 320 are drawn through and inserted over and under the corresponding warp fiber tows 310), and repeating this process until the 3D woven fabric 300 is formed. The weft fiber tows 320 can be arranged relative to each other to form the plurality of weft fiber layers 322 in the thickness direction t and to form a plurality of weft fiber columns 326 in the warp direction Wp.

The 3D woven fabric 300 also includes a plurality of interlocking fiber tows 330 (also referred to as Z-weaver fiber tows). The interlocking fiber tows 330 are additional warp fiber tows that are directed through the thickness of the 3D woven fabric 300 during weaving to stitch the reinforcing fiber tows 302 together. The interlocking fiber tows 330 are woven to extend between two or more of the weft fiber layers 322. Different fiber patterns can be used for the interlocking fiber tows 330. A first interlocking fiber pattern, shown in FIGS. 6A and 6B, is an orthogonal interlocking pattern and the interlocking fiber tows 330 are referred to herein as orthogonal interlocking fiber tows 332. In this pattern, the orthogonal interlocking fiber tows 332 extend substantially in a direction that is orthogonal to the warp direction Wp, which is the thickness direction t in the depicted embodiment. As with the weft fiber tows 320, the interlocking fiber tows 330 (e.g., the orthogonal interlocking fiber tows 332) may include a turnaround portion 334. In the depicted embodiment, the turnaround portion 334 of the orthogonal interlocking fiber tows 332 is positioned to form an alternating pattern between each warp fiber columns 314. In the depicted embodiment, the orthogonal interlocking fiber tows 332 extend through the thickness of the 3D woven fabric 300 and can be referred to as through-thickness interlocking fiber tows, but other thicknesses can be used.

Figure 6C:
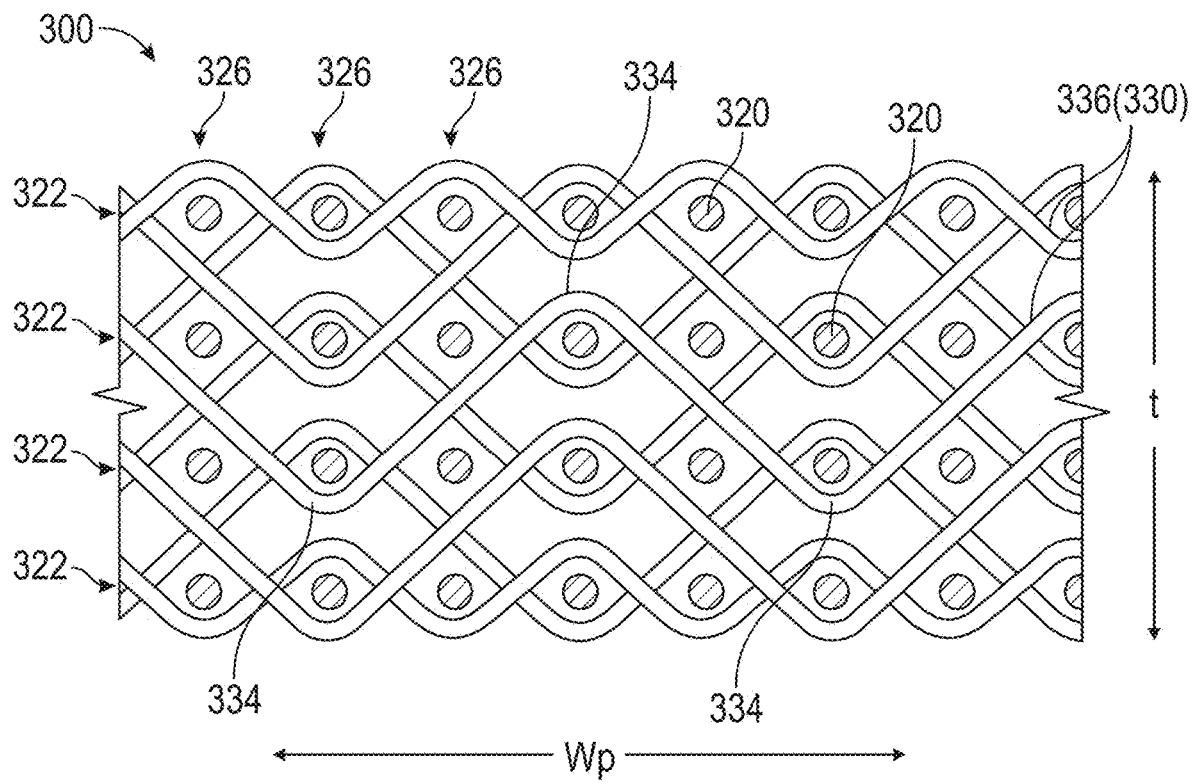
FIG. 6C is a schematic, cross-sectional view of a fiber weave pattern similar to the fiber weave pattern shown in FIG. 6A, but with a different interlocking fiber pattern.
Figure 6D:
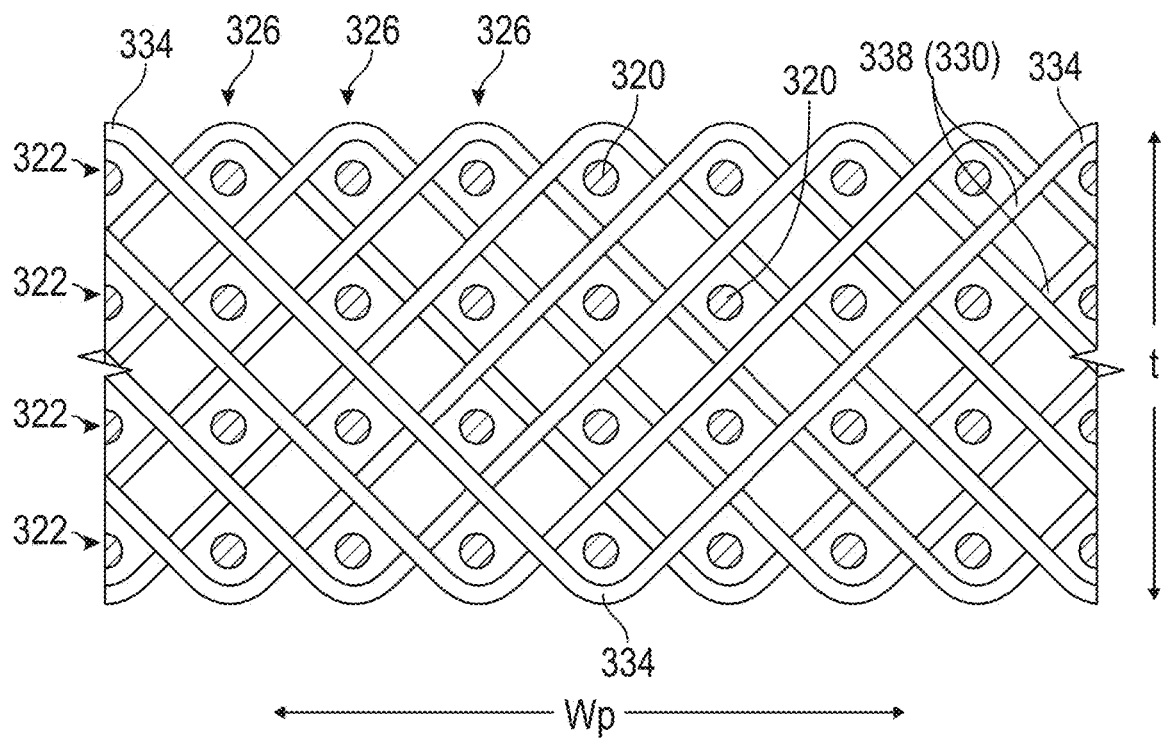
FIG. 6D is a schematic, cross-sectional view of a fiber weave pattern similar to the fiber weave pattern shown in FIG. 6A, but with another interlocking fiber pattern.

A second interlocking fiber pattern, shown in FIG. 6C, is an angle interlock pattern and, more specifically, a layer-to-layer angle interlock pattern. FIG. 6C is a cross-sectional view of a woven fabric taken from a perspective similar to that of FIG. 6B. The interlocking fiber tows 330 are referred to in this embodiment as angled interlocking fiber tows 336. Instead of extending orthogonally through the 3D woven fabric 300, the angled interlocking fiber tows 336 form an oblique angle relative to the warp direction Wp. In the depicted embodiment, the angled interlocking fiber tows 336 extend through adjacent weft fiber layers 322 in an alternating or a sinusoidal pattern to interlock these adjacent layers with each other, with the oblique angle formed between adjacent turnaround portions 334 of the angled interlocking fiber tows 336. The turnaround portions 334 of the angled interlocking fiber tows 336 are located on every other weft fiber columns 326, but, in other embodiments, two or more weft fiber columns 326 can be between adjacent turnaround portions 334 of the angled interlocking fiber tows 336. In other embodiments, the angled interlocking fiber tows 336 may extend through more than two adjacent weft fiber layers 322. For example, as shown in FIG. 6D, the interlocking fiber tows 330 are through-thickness interlocking fiber tows, which are referred to herein as through-thickness angled interlocking fiber tows 338. FIG. 6D is a cross-sectional view of a woven fabric taken from a perspective similar to FIG. 6B. The weft fiber tows 320 are omitted in FIGS. 6C and 6D for clarity.

FIG. 7 is a schematic, cross-sectional view of a portion of the 3D woven fabric 300 that can be used to form the composite sections 230 (FIGS. 3A and 3B) discussed herein. For clarity, the interlocking fiber tows 330 are omitted from FIG. 7. When a 3D woven fabric, such as the 3D woven fabric 300 discussed above, is used, the three-dimensional nature of the fabric and, particularly, the interlocking fiber tows 330 (FIG. 6A) may limit the ability of the 3D woven fabric 300 to be manipulated during the lay-up process to form the undulations 252 (FIG. 4) when formed into a preform. In some embodiments, the undulations 252 can be introduced during the weaving process. The undulations 252 can be imparted during the weaving process through the use of catch cords 340. During the weaving process, the undulations 252 are formed in the warp fiber tows 310 by offsetting the weft fiber layers 322 at different elevations in the thickness direction in an extension pattern, such as in an undulating pattern, for example. In this embodiment, the warp fiber tows 310 are the circumferential reinforcing fiber tows 250 (FIG. 4). As the weft fiber tows 320 are interwoven with the warp fiber tows 310 in the undulating pattern, additional length is introduced into the warp fiber tows 310.

To create the undulating pattern and to offset the weft fiber layers 322 in the thickness direction, the weaving processing includes using a plurality of catch cords 340. The catch cords 340 support the weft fiber tows 320 during the weaving process and are subsequently removed, as will be discussed below. The catch cords 340 are preferably formed from a material that can easily be removed once the weaving process is complete. The catch cords 340 can be formed from a polymeric material, such as nylon, and can be a polymer string. The catch cords 340 may also be formed from a metal, such as steel, and can be a wire.

The weaving process for the 3D woven fabric 300 includes placing a plurality of catch cords 340 at different elevations in the thickness direction t. The weft fiber layers 322 include a top weft fiber layer, which will be referred to herein as a supported layer 350. The weft fiber tows 320 of the supported layer 350 are supported by different catch cords 340 to create the undulating pattern. More specifically, the plurality of catch cords 340 includes an upper catch cord 342 and a lower catch cord 344. A first fiber tow 352 of the supported layer 350 is supported by the upper catch cord 342, and a second fiber tow 354 of the supported layer 350 is supported by the lower catch cord 344. The weft fiber columns 326 are offset from each other by different distances in the thickness direction t, and, more specifically, adjacent weft fiber columns 326 are offset from each other in the thickness direction t. Although the catch cords 340 can be used to offset only a portion of weft fiber tows 320 in a weft fiber column 326, the entirety of the weft fiber tows 320 in the weft fiber columns 326 are offset in the depicted embodiment.

The amount of offset in the weft fiber columns 326 can be controlled to change the length of the warp fiber tows 310 and size of the undulations 252. While this offset can be controlled by changing (i.e., increasing or decreasing) the spacing between catch cords 340, the offset may also be controlled by supporting the supported layer 350 with different catch cords 340. The plurality of catch cords 340 includes an intermediate catch cord 346 between the upper catch cord 342 and the lower catch cord 344, and a third fiber tow 356 of the supported layer 350 is supported by the intermediate catch cord 346. The third fiber tow 356 is located between the first fiber tow 352 and the second fiber tow 354 in the extension direction, which, as depicted in FIG. 7, is the warp direction Wp. After weaving and, in some embodiments after forming the initial preform in step S20 (FIG. 5) or the shaped preform in step S30 (FIG. 5), the catch cords 340 can be removed by, for example, pulling the catch cords 340 from the weft fiber tows 320.

FIG. 8A is a schematic, cross-sectional view of layers and a lay-up of the composite plies that can be used to form the composite sections 230 (FIGS. 3A and 3B) discussed herein. As discussed above a plurality of reinforcing fiber tows 410 can be laid up on a forming tool 420, such as a mandrel or a table, to form a plurality of plies including a first ply 412, a second ply 414, and a third ply 416. Three plies are shown in FIG. 8A to illustrate the method discussed herein, but other numbers of plies can be used. The plurality of plies can be laid up as individual reinforcing fiber tows 410, but, in some embodiments, the reinforcing fiber tows 410 can be woven into a woven fabric and, more specifically a 2D woven fabric. The plurality of plies can be laid up by placing a plurality of sheets of the 2D woven fabric on top of one another. The reinforcing fiber tows 410 shown in FIG. 8A can be the circumferential reinforcing fiber tows 250, discussed above, and the view depicted in FIG. 8A is looking in the axial direction A (FIGS. 3A and 3B) of the preform. Strips or plies of a resin film, which are referred to herein as resin strips 430, are periodically interleaved between the plurality of plies. The resin strips 430 can be formed of the same material, such as the same resin, that will be used to form the matrix material introduced in step S40 and the resin strips 430 then become a part of the matrix during the curing step (step S50 in FIG. 5).

As depicted in FIG. 8A, for example, a first resin strip 442 is placed on the forming tool 420 and then a second resin strip 452 is placed on the forming tool 420 spaced apart from the first resin strip 442 in the circumferential direction C. While the first resin strip 442 and the second resin strip 452 are depicted as being placed directly on the forming tool 420, alternate arrangements can be used. For example, the first resin strip 442 and the second resin strip 452 can be indirectly placed on the forming tool 420, such as by being placed on a fiber preform (such as an additional ply reinforcing fiber tows 410) that act as an underlayer or inner layer (i.e., first layer) and the first resin strip 442 and the second resin strip 452 are placed directly on the underlayer or inner layer. Each resin strip of the plurality of resin strips has a longitudinal direction, which in FIG. 8A is in and out of the page. The circumferential direction C is a direction that is transverse to the longitudinal direction, such as a direction that is orthogonal to the longitudinal direction. A plurality of resin strips 430, thus, are placed on the forming tool 420 in a spaced apart manner, such as a circumferentially spaced apart manner. The plurality of resin strips 430 can be placed parallel to each other. When the preform (and subsequently the composite sections 230) has an arcuate or annular shape, the plurality of resin strips 430 can be oriented with the longitudinal direction of each resin strip of the plurality of resin strips 430 parallel to an axial direction of the preform. Each resin strip of the plurality of resin strips 430 also includes a thickness direction that is perpendicular to the longitudinal direction in a direction. The following discussion will refer to the circumferential direction C and axial direction A (FIG. 3B) but this approach is also applicable to preforms and composite sections 230 that do not have an arcuate or annular shape and the circumferential direction C and axial direction A can be other directions, such as length directions and width directions, for these other shapes. Likewise, the circumferential reinforcing fiber tows 250 can be transverse reinforcing fiber tows that extend in the transverse direction, such as a length direction or a width direction, for preforms and composite sections 230 that do not have an arcuate or annular shape.

Then, the first ply 412 of the reinforcing fiber tows 410 is laid up on the forming tool 420, and on top of the first resin strip 442 and the second resin strip 452. Next, a third resin strip 444 is placed on the first ply 412 at the same circumferential as the first resin strip 442 to be placed above the first resin strip 442. Similarly, a fourth resin strip 454 is placed above the second resin strip 452. A plurality of resin strips 430, thus, are placed on the first resin strip 442 and the second resin strip 452 in a spaced apart manner. The second ply 414 of the reinforcing fiber tows 410 is then laid up, and the process is repeated for a fifth resin strip 446, a sixth resin strip 456, and the third ply 416. Placing the first resin strip 442, the third resin strip 444, and the fifth resin strip 446 above each other at the same circumferential position forms a first stack 440 of resin strips 430. The plurality of resin strips 430 are interleaved between the plurally of plies of the reinforcing fiber tows 410. Similarly, placing the second resin strip 452, the fourth resin strip 454, and the sixth resin strip 456 above each other at the same circumferential position forms a second stack 450 of resin strips 430. The plurality of resin strips 430 are thus arranged to form a plurality of stacks of resin strips 430 (e.g., the first stack 440 of resin strips 430 and the second stack 450 of resin strips 430) that are spaced apart from each other and, more specifically, circumferentially spaced from each other. After curing (step S50 in FIG. 5), the first stack 440 and the second stack 450 produce undulations 252 (e.g., the peaks 254) in the circumferential reinforcing fiber tows 250. The troughs 256 can be formed in a span between the stacks of resin strips 430 (e.g., the first stack 440 and the second stack 450). The thickness of the resin strips 430 and the spacing between the stacks of resin strips 430 (e.g., the first stack 440 and the second stack 450) can be controlled to produce the desired amplitudes of undulations 252 discussed above.

FIG. 8B is a schematic, cross-sectional view of layers and a lay-up of the composite plies that can be used to form the composite sections 230 (FIGS. 3A and 3B) discussed herein. The process and lay-up shown in FIG. 8B are similar to that discussed above with reference to FIG. 8A. The discussion of FIG. 8A also applies here unless otherwise explicitly noted, with like reference numerals indicating the same or similar components and features. As in FIG. 8A, the first resin strip 442 is placed on the forming tool 420 and then the second resin strip 452 is placed on the forming tool 420 (either directly or indirectly) spaced apart from the first resin strip 442 in the circumferential direction C. Then, the first ply 412 of the reinforcing fiber tows 410 is laid up on the forming tool 420, and on top of the first resin strip 442 and the second resin strip 452. Instead of placing additional resin strips 430 between the subsequent plies (e.g., the second ply 414 and the third ply 416) of the reinforcing fiber tows 410 are laid-up on top of each other. In this embodiment, the plurality of resin strips 430 placed on the forming tool 420 in a spaced apart manner (e.g., the first resin strip 442 and the second resin strip 452) produce the undulations 252 (e.g., the peaks 254) in the circumferential reinforcing fiber tows 250.

FIG. 8C is a schematic, cross-sectional view of layers and a lay-up of the composite plies that can be used to form the composite sections 230 (FIGS. 3A and 3B) discussed herein. The process and lay-up shown in FIG. 8C are similar to that discussed above with reference to FIG. 8A. The discussion of FIG. 8A also applies here unless otherwise explicitly noted, with like reference numerals indicating the same or similar components and features. In FIG. 8A, one or more resin strips 430 are used to form a stack, such as by being interleaved between the plurality of plies of reinforcing fiber tows 410. The plurality of stacks (e.g., the first stack 440 and the second stack 450) are spaced apart from each other to produce undulations 252 with the troughs 256 therebetween. Instead of using a plurality of resin strips 430, a plurality of resin sheets 460 are used. The plurality of resin sheets 460 are interleaved between the plurality of plies. The plurality of resin sheets 460 to form a continuous layer in the circumferential direction C between the forming tool 420 and the first ply 412 and in between adjacent plies, such as between the first ply 412 and the second ply 414 and between the second ply 414 and the third ply 416. While FIG. 8C depicts each ply separated by one resin sheet of the plurality of resin sheets 460, other arrangements can be used with some plies being positioned to directly contact each other instead of having a resin sheet between each ply. Additionally, an underlayer or inner layer of reinforcing fiber tows 410 can be used, as discussed above.

As depicted in FIG. 8C, for example, a first resin sheet 462 is placed on the forming tool 420. Then, the first ply 412 of the reinforcing fiber tows 410 is laid up on the forming tool 420, and on top of the first resin sheet 462. Next, a second resin sheet 464 is placed on the first ply 412 and the second ply 414 of the reinforcing fiber tows 410 is then laid up. The process is repeated for a third resin sheet 466 and the third ply 416. The plurality of resin sheets 460 are interleaved between the plurally of plies of the reinforcing fiber tows 410. The additional resin sheets 460 add length to the circumferential reinforcing fiber tows 250 and during curing (step S50 in FIG. 5), the resin sheets 460 flow allowing the circumferential reinforcing fiber tows 250 to produce undulations 252 (e.g., the peaks 254) and troughs 256 on a microscale (e.g., less than a millimeter between adjacent undulations 252, such as one hundred micrometers or less between adjacent undulations 252).

Figure 9:
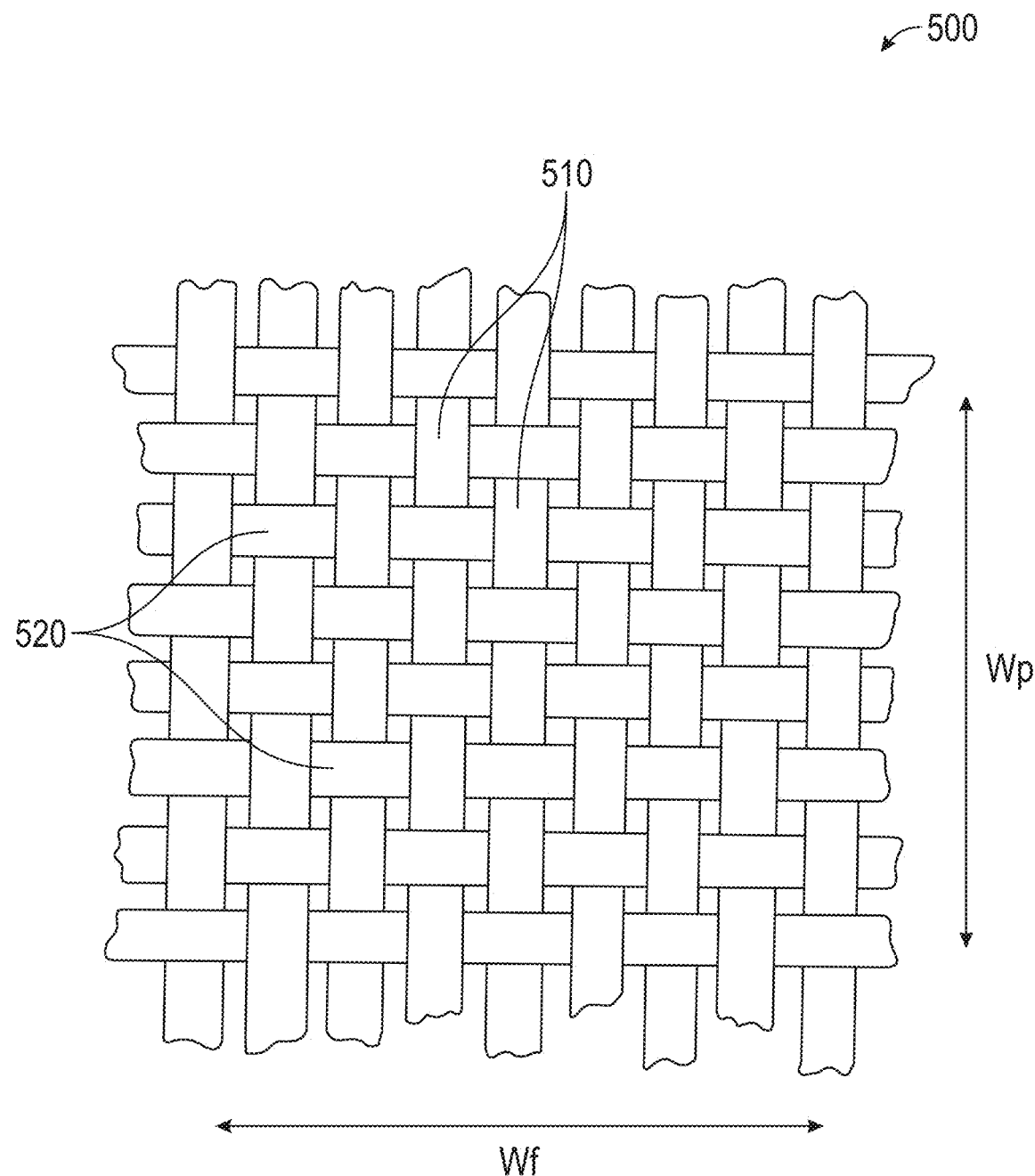
FIG. 9 is a top, schematic view of a two-dimensional (2D) woven fabric that can be used to form the composite section and that can be used in the lay-up process of any one of FIGS. 8A to 8C.

FIG. 9 is a top, schematic view of a 2D woven fabric 500 that can be used to form the composite section 230 (FIGS. 3A and 3B) discussed herein and that can be used in the lay-up process discussed above with reference to FIG. 8. During a weaving process, the warp fiber tows 510 can be held in tension in the warp direction Wp, and one of the weft fiber tows 520 is passed or drawn therethrough. A shuttle (not shown) can be used to draw the one of the weft fiber tows 520 through the warp fiber tows 510. The shuttle can be passed through the warp fiber tows 510 in a first direction and then reversed to pass through the warp fiber tows 510 at a different position in the warp direction Wp. The warp fiber tows 510 can be moved relative to each other to allow a space for the one of the weft fiber tows 520 to pass through the space. The warp fiber tows 510 can be moved relative to each other in different ways to create different patterns. In this way, weaving the 2D woven fabric 500 includes positioning the warp fiber tows 510 (e.g., such that the warp fiber tows 510 are held stationary in tension), then laying the weft fiber tows 520 (e.g., such that the weft fiber tows 520 are drawn through and inserted over and under the corresponding warp fiber tows 510), and repeating this process until the 2D woven fabric 500 is formed. FIG. 9 depicts a plain weave, but other weave patterns can be used including, for example, twill weave patterns and satin weave patterns. In some embodiments, the circumferential reinforcing fiber tows 250 are the warp fiber tows 510.

The composite sections 230 discussed herein have a fiber pattern that allows for thermal expansion of the composite section 230. Such a composite section 230 can be used to form composite casings (e.g., the fan casing 200, 240), such as casing for rotors and, more specifically, rotating airfoils. When the rotors are formed from a dissimilar material from the composite casing, the fiber pattern allows for thermal expansion of the casing, among other things, to provide for desirable clearances between the casing and the rotor throughout the entire operating envelope. Further aspects of the present disclosure are provided by the subject matter of the following clauses.

A casing for a turbine engine includes a composite section having (i) an arcuate shape or an annular shape and (ii) a circumferential direction. The composite section includes a matrix and a plurality of circumferential reinforcing fiber tows embedded in the matrix formed of a matrix material. Each circumferential reinforcing fiber tow of the plurality of circumferential reinforcing fiber tows extends in the circumferential direction and has a plurality of undulations in the circumferential direction to allow the matrix material of the composite section to expand circumferentially.

The casing of the preceding clause, wherein composite section has a radial direction and each undulation of the plurality of undulations has an amplitude that extends in the radial direction.

The casing of any preceding clause, wherein the plurality of undulations has a uniform alternating pattern in the circumferential direction.

The casing of any preceding clause, wherein the composite section has a circumferential length and each circumferential reinforcing fiber tow of the plurality of circumferential reinforcing fiber tows has a length, the plurality of undulations being sized such that the length of each circumferential reinforcing fiber tow is longer than the circumferential length of the composite section.

The casing of any preceding clause, wherein the composite section has an axial direction, and the plurality of circumferential reinforcing fiber tows is angled in the axial direction.

The casing of any preceding clause, wherein the composite section is one composite section of a plurality of composite sections, each composite section of the plurality of composite sections having an arcuate shape and including the matrix and the plurality of circumferential reinforcing fiber tows embedded in the matrix, the plurality of composite sections being arranged to form an annular casing having the circumferential direction.

The casing of any preceding clause, wherein the plurality of circumferential reinforcing fiber tows is arranged in a plurality of layers in a radial direction.

The casing of the preceding clause, wherein the plurality of layers is a plurality of plies of a two-dimensional woven fabric.

The casing of any preceding clause, wherein the plurality of circumferential reinforcing fiber tows is part of a woven fabric, the woven fabric having the plurality of undulations.

The casing of the preceding clause, wherein the plurality of circumferential reinforcing fiber tows is warp fiber tows of the woven fabric.

The casing of any preceding clause, wherein the woven fabric includes a plurality of the reinforcing fiber tows including a plurality of first fiber tows and a plurality of second fiber tows oriented transversely to the plurality of first fiber tows, the plurality of circumferential reinforcing fiber tows being one of the plurality of first fiber tows or the plurality of second fiber tows, the woven fabric is a three-dimensional woven fabric having a first direction, a second direction orthogonal to the first direction, and a thickness direction orthogonal to each of the first direction and the second direction, the plurality of first fiber tows being arranged in the thickness direction to form a plurality of first fiber layers and the plurality of second fiber tows being arranged in the thickness direction to form a plurality of second fiber layers.

The casing of the preceding clause, wherein the reinforcing fiber tows include a plurality of interlocking fiber tows.

A turbine engine includes a rotor and the casing of the casing of any preceding clause circumferentially surrounding the rotor.

The turbine engine of the preceding clause, wherein the rotor is formed from a metal material and the matrix is a polymer.

The turbine engine of any preceding clause, wherein the rotor is a rotating airfoil assembly including a plurality of airfoils extending radially from a central hub.

The turbine engine of the preceding clause, wherein the rotating airfoil assembly is positioned relative to the casing to define a gap between the casing and tips of the airfoils.

The turbine engine of the preceding clause, wherein the turbine engine includes a compressor section having one or more compressor rotors, the rotating airfoil assembly being one of the compressor rotors and the airfoils being compressor blades.

The turbine engine of any preceding clause, wherein the turbine engine includes a fan section, the rotating airfoil assembly being a fan and the airfoils being fan blades.

The turbine engine of any preceding clause, wherein the composite section has a circumferential length and each circumferential reinforcing fiber tow of the plurality of circumferential reinforcing fiber tows has a length, the plurality of undulations being sized such that the length of each circumferential reinforcing fiber tow permits thermal expansion of the matrix to maintain the gap during an operating condition of the turbine engine.

The turbine engine of the preceding clause, wherein the operating condition is a temperature from negative seventy degrees Fahrenheit to seven hundred degrees Fahrenheit.

A method of forming a preform for composite section of a casing for a turbine engine includes placing a plurality of resin strips on a forming tool and laying up a plurality of reinforcing fiber tows on the forming tool and the plurality of resin strips to form a plurality of plies. Each resin strip of the plurality of resin strips has a longitudinal direction and is spaced apart from one or more adjacent resin strips of the plurality of resin strips in a transverse direction that is transverse to the longitudinal direction. The plurality of reinforcing fiber tows includes transverse reinforcing fiber tows that extend in the transverse direction.

The method of forming the preform of the preceding clause, wherein each ply of the plurality of plies is a two-dimensional woven fabric.

The method of forming the preform of any preceding clause, wherein the preform has (i) an arcuate shape or an annular shape and (ii) a circumferential direction, the circumferential direction being the transverse direction, and the transverse reinforcing fiber tows are circumferential reinforcing fiber tows.

The method of forming the preform of any preceding clause, wherein the preform has an axial direction, and the plurality of resin strips are oriented with the longitudinal direction of each resin strip of the plurality of resin strips parallel to the axial direction.

The method of forming the preform of any preceding clause, wherein the plurality of resin strips are placed directly on the forming tool.

The method of forming the preform of any preceding clause, wherein the forming tool is a mandrel.

The method of forming the preform of any preceding clause, wherein laying up the plurality of plies includes wrapping the circumferential reinforcing fiber tows in a circumferential direction about the mandrel.

The method of forming the preform of any preceding clause, wherein each ply of the plurality of plies is a two-dimensional woven fabric having warp fiber tows and weft fiber tows, the circumferential reinforcing fiber tows being warp fiber tows of the two-dimensional woven fabric.

The method of forming the preform of any preceding clause, wherein the plurality of resin strips is a plurality of first resin strips forming a first layer or resin strips, wherein the method further comprises placing a plurality of second resin strips on one of the plurality of plies of reinforcing fiber tows to form a second layer or resin strips, each second resin strip of the plurality of resin strips having a longitudinal direction and being spaced apart from one or more adjacent second resin strips of the plurality of second resin strips in the transverse direction.

The method of forming the preform of any preceding clause, wherein one or more plies of the plurality of plies of reinforcing fibers is laid up on top of the plurality of second resin strips.

The method of forming the preform of any preceding clause, wherein each second resin strip of the plurality of second resin strips is placed above a corresponding first resin strip of the plurality of first resin strips to form a plurality of stacks of resin strips.

A method of forming a preform for composite section of a casing for a turbine engine includes placing a first resin sheet a forming tool, laying up a plurality of reinforcing fiber tows on the first resin sheet to form a first ply reinforcing fiber tows, placing a second resin sheet on the first ply, and laying up a plurality of reinforcing fiber tows on the second resin sheet to form a second ply. The preform has (i) an arcuate shape or an annular shape and (ii) a circumferential direction. The plurality of reinforcing fiber tows of the first ply includes circumferential reinforcing fiber tows extending in the circumferential direction, and the plurality of reinforcing fiber tows of the second ply includes circumferential reinforcing fiber tows extending in the circumferential direction.

The method of forming the preform of the preceding clause, wherein the first resin sheet is placed directly on the forming tool.

The method of forming the preform of any preceding clause, wherein the plurality of reinforcing fiber tows of the first ply are woven as a two-dimensional woven fabric, and the plurality of reinforcing fiber tows of the second ply are woven as a two-dimensional woven fabric.

The method of forming the preform of any preceding clause, wherein each of the two-dimensional woven fabrics has warp fiber tows and weft fiber tows, the circumferential reinforcing fiber tows being warp fiber tows of each of the two-dimensional woven fabrics.

A method of forming a preform with (i) an arcuate shape or an annular shape and (ii) a circumferential direction for composite section of a casing for a turbine engine includes placing a plurality of reinforcing fiber tows including a plurality of circumferential reinforcing fiber tows, with each circumferential reinforcing fiber tow of the plurality of circumferential reinforcing fiber tows extending in the circumferential direction.

The method of forming the preform of any preceding clause, further includes arranging the plurality of circumferential reinforcing fiber tows in a plurality of fiber layers in the radial direction.

The method of forming the preform of any preceding clause, further includes laying up a plurality of plies of a two-dimensional woven fabric in the radial direction.

The method of forming the preform of any preceding clause, further includes interleaving a plurality of resin strips between the fiber layers or the plurality of plies to form the plurality of undulations.

The method of forming the preform of any preceding clause, wherein the plurality of circumferential reinforcing fiber tows is part of a woven fabric, the woven fabric having the plurality of undulations.

The method of forming the preform of any preceding clause, wherein the plurality of circumferential reinforcing fiber tows is warp fiber tows of the woven fabric.

The method of forming the preform of any preceding clause, further comprising weaving the plurality of reinforcing fiber tows to form a woven fabric.

The method of forming the preform of the preceding clause, wherein the plurality of reinforcing fiber tows includes a plurality of first fiber tows and a plurality of second fiber tows oriented transversely to the plurality of first fiber tows, the plurality of circumferential reinforcing fiber tows being one of the plurality of first fiber tows or the plurality of second fiber tows, the woven fabric is a three-dimensional woven fabric having a first direction, a second direction orthogonal to the first direction, and a thickness direction orthogonal to each of the first direction and the second direction, the plurality of first fiber tows being arranged in the thickness direction to form a plurality of first fiber layers and the plurality of second fiber tows being arranged in the thickness direction to form a plurality of second fiber layers.

The method of forming the preform of any preceding clause, wherein the reinforcing fiber tows include a plurality of interlocking fiber tows.

The method of forming a preform of the preceding clause, wherein the interlocking fiber tows are woven in an orthogonal interlocking pattern.

The method of forming a preform of the preceding clause, wherein the orthogonal interlocking pattern extends through the thickness of the woven fabric.

The method of forming the preform of any preceding clause, wherein the interlocking fiber tows are woven in an angled interlock pattern.

The method of forming the preform of any preceding clause, wherein the angled interlock pattern extends through adjacent fiber layers in an alternating pattern or a sinusoidal pattern to interlock these adjacent layers with each other.

The method of forming the preform of any preceding clause, wherein the angled interlock pattern extends through more than two adjacent fiber layers.

The method of forming the preform of any preceding clause, wherein the angled interlock pattern extends through the thickness of the woven fabric.

The method of forming the preform of any preceding clause, wherein the plurality of first fiber tows is a plurality of warp fiber tows and the plurality of second fiber tows is a plurality of weft fiber tows.

The method of forming the preform of any preceding clause, wherein the first direction is a warp direction and the second direction is a weft direction.

The method of forming a composite section of a casing for a turbine engine includes forming a preform using the method of forming a preform of any preceding clause, introducing a matrix material into the preform.

The method of forming the composite section of the preceding clause, further comprising curing the preform including the matrix material to generate the composite section with the plurality of circumferential reinforcing fiber tows having a plurality of undulations in the circumferential direction.

The method of forming the composite section of any preceding clause, further comprising curing the preform including the matrix material, the first resin sheet, and the second resin sheet to generate the composite section with the circumferential reinforcing fiber tows of each of the first ply and the second ply having a plurality of undulations in the circumferential direction.

The method of forming the composite section of any preceding clause, further comprising curing the preform including the matrix material and the plurality of resin strips to generate the composite section with the transverse reinforcing fiber tows of plurality of reinforcing fiber tows having a plurality of undulations in the transverse direction.

The method of forming the composite section of any preceding clause, wherein the plurality of undulations comprises a plurality of peaks and a plurality of troughs, the plurality of peaks being formed at a transverse location corresponding to the positioning of each strip of the plurality of strips.

The method of forming the composite section of any preceding clause, wherein the plurality of undulations comprises a plurality of peaks and a plurality of troughs, the plurality of peaks being formed at a transverse location corresponding to the positioning of each stack of the plurality of stacks of resin strips.

The method of forming the composite section of any preceding clause, wherein the composite section has a radial direction and each undulation of the plurality of undulations has an amplitude that extends in the radial direction.

The method of forming the composite section of any preceding clause, wherein the plurality of undulations has a uniform alternating pattern in the circumferential direction.

The method of forming the composite section of any preceding clause, wherein the composite section has a circumferential length and each circumferential reinforcing fiber tow of the plurality of circumferential reinforcing fiber tows has a length, the plurality of undulations being sized such that the length of each circumferential reinforcing fiber tow is longer than the circumferential length of the composite section.

The method of forming the composite section of any preceding clause, wherein the preform has an axial direction, and the plurality of circumferential reinforcing fiber tows are angled in the axial direction.

The method of forming the composite section of any preceding clause, wherein introducing the matrix material includes injecting the matrix material into the preform.

The method of forming the composite section of any preceding clause, wherein the plurality of reinforcing fiber tows includes prepreg fiber tows to introduce the matrix material.

The method of forming the composite section of any preceding clause, wherein each strip of the plurality of strips are the same resin as the resin used to form the matrix material.

The method of forming the composite section of any preceding clause, wherein
first resin sheet and the second resin sheet are the same resin as the resin used to form the matrix material.

A method of forming a casing for a turbine engine includes forming a plurality of the composite sections of any preceding clause and arranging the plurality of composite sections to form an annular casing having the circumferential direction.

Although the foregoing description is directed to certain embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A casing for a turbine engine, the casing comprising:
a composite section having an arcuate shape or an annular shape and extending in a circumferential direction, the composite section including a matrix formed of a matrix material and a plurality of circumferential reinforcing fiber tows embedded in the matrix, each circumferential reinforcing fiber tow of the plurality of circumferential reinforcing fiber tows extending in the circumferential direction and having a plurality of undulations in the circumferential direction to allow the matrix material of the composite section to expand circumferentially.

2. The casing of claim 1, wherein the composite section extends in a radial direction and each undulation of the plurality of undulations has an amplitude that extends in the radial direction.

3. The casing of claim 1, wherein the plurality of undulations has a uniform alternating pattern in the circumferential direction.

4. The casing of claim 1, wherein the composite section has a circumferential length and each circumferential reinforcing fiber tow of the plurality of circumferential reinforcing fiber tows has a length, the plurality of undulations being sized such that the length of each circumferential reinforcing fiber tow is longer than the circumferential length of the composite section.

5. The casing of claim 1, wherein the composite section extends in an axial direction, and the plurality of circumferential reinforcing fiber tows is angled in the axial direction.

6. The casing of claim 1, wherein the composite section is the arcuate shape and one composite section of a plurality of composite sections, each composite section of the plurality of composite sections having an arcuate shape and including the matrix and the plurality of circumferential reinforcing fiber tows embedded in the matrix, the plurality of composite sections being arranged to form an annular casing extending in the circumferential direction.

7. The casing of claim 1, wherein the plurality of circumferential reinforcing fiber tows is arranged in a plurality of layers in a radial direction.

8. The casing of claim 7, wherein the plurality of layers is a plurality of plies of a two-dimensional woven fabric.

9. The casing of claim 1, wherein the plurality of circumferential reinforcing fiber tows is part of a woven fabric, the woven fabric having the plurality of undulations.

10. The casing of claim 9, wherein the plurality of circumferential reinforcing fiber tows is warp fiber tows of the woven fabric.

11. The casing of claim 9, wherein the woven fabric includes a plurality of the reinforcing fiber tows including a plurality of first fiber tows and a plurality of second fiber tows oriented transversely to the plurality of first fiber tows, the plurality of circumferential reinforcing fiber tows being one of the plurality of first fiber tows or the plurality of second fiber tows, the woven fabric is a three-dimensional woven fabric having a first direction, a second direction orthogonal to the first direction, and a thickness direction orthogonal to each of the first direction and the second direction, the plurality of first fiber tows being arranged in the thickness direction to form a plurality of first fiber layers and the plurality of second fiber tows being arranged in the thickness direction to form a plurality of second fiber layers.

12. The casing of claim 11, wherein the reinforcing fiber tows include a plurality of interlocking fiber tows.

13. A turbine engine comprising:
 a rotor; and
 the casing of claim 1 surrounding the rotor in the circumferential direction.

14. The turbine engine of claim 13, wherein the rotor is formed from a metal material and the matrix material is a polymer.

15. The turbine engine of claim 13, wherein the rotor is a rotating airfoil assembly including a plurality of airfoils extending radially from a central hub.

16. The turbine engine of claim 15, wherein the rotating airfoil assembly is positioned relative to the casing to define a gap between the casing and tips of the airfoils.

17. The turbine engine of claim 16, comprising a compressor section having one or more compressor rotors, the rotating airfoil assembly being one of the compressor rotors and the airfoils being compressor blades.

18. The turbine engine of claim 16, comprising a fan section, the rotating airfoil assembly being a fan and the airfoils being fan blades.

19. The turbine engine of claim 16, wherein the composite section has a circumferential length and each circumferential reinforcing fiber tow of the plurality of circumferential reinforcing fiber tows has a length, the plurality of undulations being sized such that the length of each circumferential reinforcing fiber tow permits thermal expansion of the matrix to maintain the gap during an operating condition of the turbine engine.

20. The turbine engine of claim 19, wherein the operating condition is a temperature from negative seventy degrees Fahrenheit to seven hundred degrees Fahrenheit.

* * * * *